(12) United States Patent
Obukhov

(10) Patent No.: US 9,626,517 B2
(45) Date of Patent: Apr. 18, 2017

(54) NON-DETERMINISTIC ENCRYPTION

(71) Applicant: Seagate Technology LLC, Cupertino, CA (US)

(72) Inventor: Dmitry Obukhov, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 576 days.

(21) Appl. No.: 14/158,955

(22) Filed: Jan. 20, 2014

(65) Prior Publication Data

US 2016/0239666 A1   Aug. 18, 2016

Related U.S. Application Data

(60) Provisional application No. 61/755,951, filed on Jan. 23, 2013.

(51) Int. Cl.
G06F 21/60 (2013.01)
G06F 21/79 (2013.01)
(Continued)

(52) U.S. Cl.
CPC ........ *G06F 21/602* (2013.01); *G06F 11/1068* (2013.01); *G06F 21/79* (2013.01); *G09C 1/00* (2013.01); *H04L 9/065* (2013.01); *H04L 9/0618* (2013.01); *H04L 9/304* (2013.01); *G11C 29/52* (2013.01); *G11C 2029/0411* (2013.01); *H04L 2209/34* (2013.01)

(58) Field of Classification Search
CPC .... G06F 21/602; G06F 21/62; G06F 21/6218; G06F 21/6227; G06F 21/6254; G06F 21/3679; G06F 11/1068; G06F 2212/402; H04L 29/52; H04L 9/0618; H04L 9/302; H04L 9/304

See application file for complete search history.

(56) References Cited

U.S. PATENT DOCUMENTS 5,222,141 A * 6/1993 Killian ................. H04L 9/065
                                                                380/255
6,341,164 B1 * 1/2002 Dilkie .................. H04L 9/0825
                                                                380/278

(Continued)

*Primary Examiner* — Izunna Okeke
*Assistant Examiner* — Sher A Khan
(74) *Attorney, Agent, or Firm* — Hall Estill Attorneys at Law

(57) ABSTRACT

A non-deterministic encryption functionality receives and encrypts an open-text input stream. Codes for error-correction are generated for the encrypted stream, and a correctable amount of non-deterministic random error is overlaid onto the encrypted stream and the codes for error-correction. The error-injected encrypted stream and codes for error-correction are re-encrypted and delivered to a using process. A non-deterministic decryption functionality reverses the encryption, in some embodiments using key values used during the encryption, and delivers an open-text stream to a using process. Some embodiments of a non-deterministic encryption include a reversible scrambling layer. In some embodiments, the non-deterministic encryption and decryption functionalities are performed, at least in part, by a controller of a solid state disk. In some embodiments, the functionalities are performed within a secure physical boundary provided by implementation within a single integrated circuit.

17 Claims, 8 Drawing Sheets

(51) Int. Cl.
*H04L 9/06* (2006.01)
*H04L 9/30* (2006.01)
*G06F 11/10* (2006.01)
*G09C 1/00* (2006.01)
G11C 29/52 (2006.01)
G11C 29/04 (2006.01)

(56) References Cited

U.S. PATENT DOCUMENTS

| | | | | |
|---|---|---|---|---|
| 7,792,300 B1* | 9/2010 | Caronni | ............. | G06Q 20/3829 380/259 |
| 8,010,876 B2* | 8/2011 | Hsieh | ................. | G06F 11/1068 365/185.09 |
| 8,161,346 B2* | 4/2012 | Hirose | ................ | G06F 11/1068 714/754 |
| 8,219,883 B2* | 7/2012 | Hsu | .................... | G06F 11/1068 714/763 |
| 8,707,104 B1* | 4/2014 | Jean | .................... | G06F 11/1048 714/41 |
| 2002/0018561 A1* | 2/2002 | Emelko | .................. | H04L 9/304 380/28 |
| 2003/0012372 A1* | 1/2003 | Cheng | .............. | H03M 13/2957 380/28 |
| 2003/0061500 A1* | 3/2003 | Mimura | ........... | G11B 20/00086 713/193 |
| 2005/0028057 A1* | 2/2005 | Briggs | ................. | G06F 11/1028 714/718 |
| 2005/0028096 A1* | 2/2005 | Harrington | ........... | G06F 17/211 715/234 |
| 2005/0204255 A1* | 9/2005 | Yeh | .................... | H03M 13/6343 714/755 |
| 2007/0283217 A1* | 12/2007 | Gorfajn | ............. | G06F 11/1008 714/758 |
| 2009/0168994 A1* | 7/2009 | Heuss | ....................... | H04L 9/06 380/28 |
| 2010/0180182 A1* | 7/2010 | Trantham | ............. | G06F 11/1008 714/799 |
| 2010/0220565 A1* | 9/2010 | Hasebe | ........... | G11B 20/00086 369/47.14 |
| 2011/0055641 A1* | 3/2011 | Westby | ............... | G06F 11/1012 714/57 |
| 2011/0145680 A1* | 6/2011 | Akiyama | ......... | G11B 20/00086 714/769 |
| 2012/0278635 A1* | 11/2012 | Hars | ....................... | G06F 12/14 713/193 |
| 2012/0317340 A1* | 12/2012 | So | ........................ | G06F 11/1068 711/103 |
| 2012/0317341 A1* | 12/2012 | So | ........................ | G06F 11/1008 711/103 |
| 2014/0040639 A1* | 2/2014 | Raam | .................... | G06F 21/606 713/193 |

* cited by examiner

NON-DETERMINISTIC ENCRYPTION

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. Provisional Application and Ser. No. 61/755,951), filed 23 Jan. 2013, first named inventor Dmitry OBUKHOV, and entitled NON-DETERMINISTIC ENCRYPTION.

BACKGROUND

Field

Advancements in encryption/decryption technology are needed to provide improvements in performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, including as a process, an article of manufacture, an apparatus, a system, a composition of matter, and a computer readable medium such as a computer readable storage medium (e.g., media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

LIST OF REFERENCE SYMBOLS IN DRAWINGS

Figure 1A:
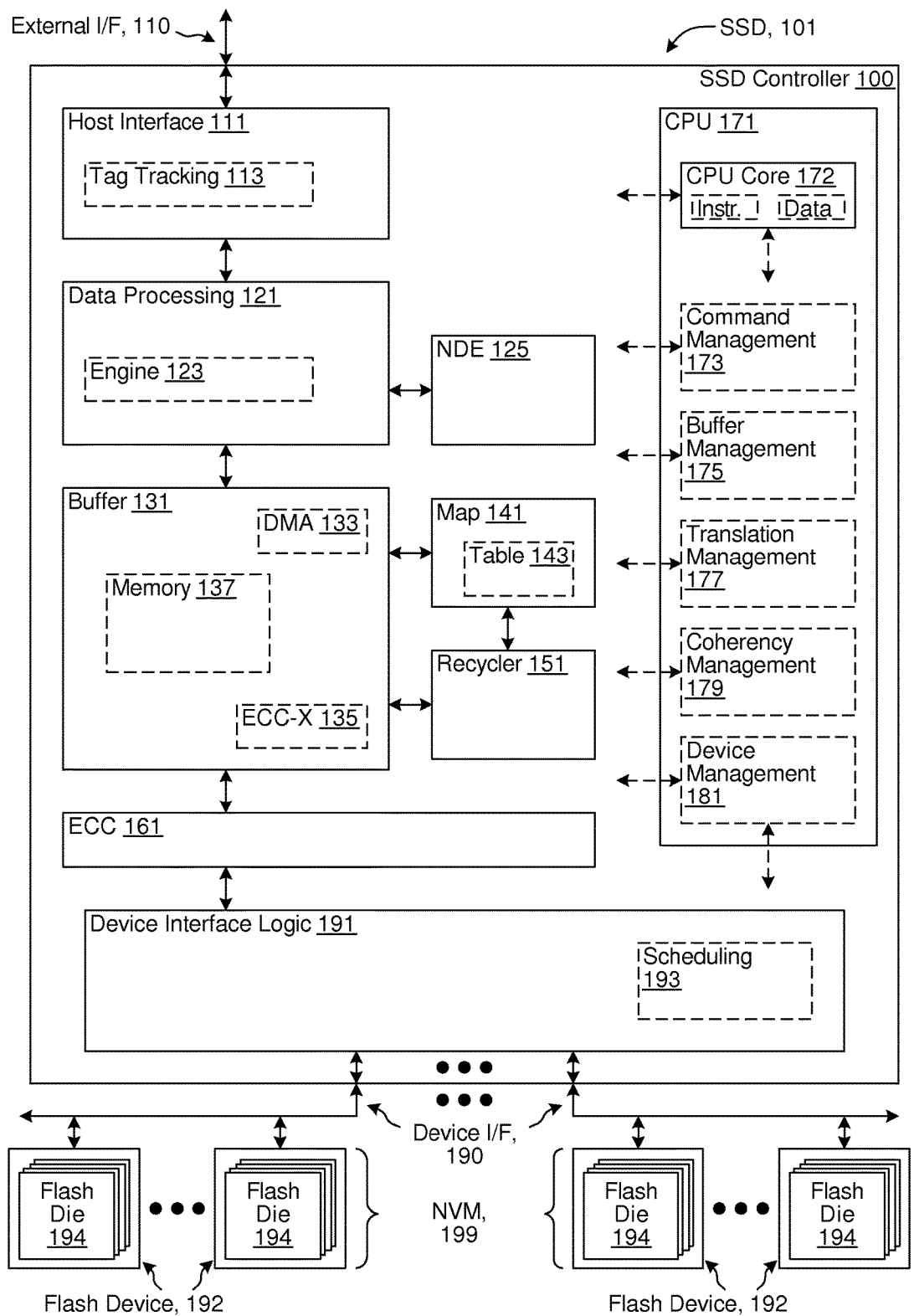
FIG. 1A illustrates selected details of an embodiment of a Solid-State Disk (SSD) including an SSD controller using non-deterministic encryption techniques for managing non-volatile storage, such as implemented via Non-Volatile Memory (NVM) elements (e.g., flash memories).

| Ref. Symbol | Element Name |
|---|---|
| 100 | SSD controller |
| 101 | SSD |
| 102 | host |
| 103 | intermediate controller |
| 104 | intermediate interfaces |
| 110 | external interfaces |
| 111 | host interface |
| 113 | tag tracking |
| 121 | data processing |
| 123 | engine(s) |
| 125 | NDE |
| 131 | buffer |
| 133 | DMA |
| 135 | ECC-X |
| 137 | memory |
| 141 | map |
| 143 | table |
| 151 | recycler |
| 161 | ECC |
| 171 | CPU |
| 172 | CPU core |
| 173 | command management |
| 175 | buffer management |
| 177 | translation management |
| 179 | coherency management |
| 181 | device management |
| 190 | device interfaces |
| 191 | device interface logic |
| 192 | flash devices |
| 193 | scheduling |
| 194 | flash die |
| 199 | non-volatile memory |
| 200 | Engine and data elements, generally |
| 202 | Open-text data OT |
| 204 | Enlarged cipher-text data CT |
| 225 | Non-deterministic encryption/decryption engine NDE |
| 300 | Non-deterministic encryption functionality, generally |
| 302 | Input encryption layer $AES_1$ |
| 304 | Code for error-correction generation layer CEG |
| 306 | Error-injection layer ERR |
| 308 | Output encryption layer $AES_2$ |
| 310 | Open-text input $OT_N$ |
| 312 | Input encryption key $K_1$ |
| 314 | Cipher-text $CT_1$ |
| 318 | Code for error-correction CEC |
| 320 | Error-injected cipher-text $CT_1 + E_B$ |
| 322 | Error-injected code for error-correction CEC + $E_C$ |
| 324 | Output encryption key $K_2$ |
| 326 | Enlarged cipher-text output $CT_2$ |
| 328 | Cipher-text output code for error-correction $CT_E$ |
| 330 | Non-deterministic encryption functionality, generally |
| 332 | Reversible scrambling layer SCR |
| 340 | Non-deterministic encryption functionality, generally |
| 342 | Reversible scrambling layer SCR |
| 350 | Non-deterministic encryption functionality, generally |
| 352 | Reversible scrambling layer SCR |
| 360 | Non-deterministic encryption functionality, generally |
| 362 | Reversible scrambling layer SCR |
| 364 | Standard AES block-size error-injection layer ERR |
| 370 | Non-deterministic encryption functionality, generally |
| 372 | Reversible scrambling layer SCR |
| 400 | Non-deterministic decryption functionality, generally |
| 402 | Input decryption layer $AES_2$ |
| 404 | Injected error-correction layer ECE |
| 406 | Output decryption layer $AES_1$ |
| 408 | Enlarged cipher-text input $CT_2$ |
| 412 | Error-injected cipher-text $CT_1 + E_B$ |
| 414 | Input decryption key $K_2$ |
| 416 | Error-injected code for error-correction CEC + $E_C$ |
| 418 | Cipher-text $CT_1$ |
| 420 | Output decryption key $K_1$ |
| 422 | Open-text output $OT_O$ |
| 430 | Non-deterministic decryption functionality, generally |
| 432 | Reverse-scrambling layer RSC |
| 440 | Non-deterministic decryption functionality, generally |
| 442 | Reverse-scrambling layer RSC |
| 500 | Example of error-injection layer functionality, generally |
| 502 | Cipher-text $CT_1$ |
| 504 | Code for error-correction CEC |
| 506 | Constrained pseudo-random number generator CRNG |
| 508 | Error-mask data field $E_B$ |
| 510 | Error-mask code for error-correction field $E_C$ |
| 512 | Block exclusive-OR function |
| 514 | Code exclusive-OR function |
| 516 | Error-injected cipher-text $CT_1 + E_B$ |
| 518 | Error-injected code for error-correction CEC + $E_C$ |
| 520 | Error-injection functionality, generally |
| 522 | Constrained pseudo-random number generator CRNG |
| 600 | Non-deterministic encryption functionality, generally |
| 604 | Code for error-correction generation layer CEG |
| 606 | Error-injection layer ERR |
| 608 | Output encryption layer $AES_2$ |
| 610 | Counter CTR |
| 618 | Current count CNT |
| 620 | Code for error-correction CEC |
| 622 | Exclusive-OR function |
| 624 | Compound error code for error-correction CEC^CNT |
| 626 | Error-injected cipher-text $CT_1 + E_B$ |
| 628 | Error-injected code (CEC^CNT) + $E_C$ |
| 700 | Non-deterministic decryption functionality, generally |
| 702 | Input decryption layer $AES_2$ |
| 704 | Injected error-correction layer ECE |
| 714 | Error-injected cipher-text $CT_1 + E_B$ |
| 716 | Error-injected code (CEC^CNT) + $E_C$ |
| 724 | Current count CNT |
| 726 | Counter CTR |
| 728 | Exclusive-OR function |
| 730 | Error-injected code for error-correction CEC + $E_C$ |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

ACRONYMS

At least some of the various shorthand abbreviations, or acronyms defined here refer to certain elements used herein.

| Acronym | Description |
|---------|-------------|
| AES | Advanced Encryption Standard |
| ASCII | American Standard Code for Information Interchange |
| BCH | Bose Chaudhuri Hocquenghem |
| CD | Compact Disk |
| CF | Compact Flash |
| CMOS | Complementary Metal Oxide Semiconductor |
| CPU | Central Processing Unit |
| CRC | Cyclic Redundancy Check |
| DDR | Double-Data-Rate |
| DES | Data Encryption Standard |
| DMA | Direct Memory Access |
| DVD | Digital Versatile/Video Disk |
| ECC | Error-Correcting Code |
| eSATA | external Serial Advanced Technology Attachment |
| FUA | Force Unit Access |
| HDD | Hard Disk Drive |
| IC | Integrated Circuit |
| IDE | Integrated Drive Electronics |
| JPEG | Joint Photographic Experts Group |
| LBA | Logical Block Address |
| LDPC | Low-Density Parity-Check |
| LPN | Logical Page Number |
| LZ | Lempel-Ziv |
| MLC | Multi-Level Cell |
| MMC | MultiMediaCard |
| MPEG | Moving Picture Experts Group |

-continued

| Acronym | Description |
|---------|-------------|
| NCQ | Native Command Queuing |
| NDK | Non-Deterministic Key |
| NVM | Non-Volatile Memory |
| ONFI | Open NAND Flash Interface |
| PC | Personal Computer |
| PCIe | Peripheral Component Interconnect express (PCI express) |
| PDA | Personal Digital Assistant |
| RAID | Redundant Array of Inexpensive/Independent Disks |
| RS | Reed-Solomon |
| RSA | Rivest, Shamir & Adleman |
| SAS | Serial Attached Small Computer System Interface (Serial SCSI) |
| SATA | Serial Advanced Technology Attachment (Serial ATA) |
| SCSI | Small Computer System Interface |
| SD | Secure Digital |
| SECDED | Single Error Correction Double Error Detection |
| SLC | Single-Level Cell |
| SMART | Self-Monitoring Analysis and Reporting Technology |
| SPB | Secure Physical Boundary |
| SSD | Solid-State Disk/Drive |
| USB | Universal Serial Bus |

In various embodiments and/or usage scenarios, open-text data received from a host is encrypted via one or more of a plurality of non-deterministic techniques for storage on an SSD as cipher-text. The cipher-text is decrypted from the SSD before returning to the host as open-text. The decryption is compatible with the non-deterministic encryption to produce open-text from corresponding cipher-text. In various embodiments and/or usage scenarios, open-text data is encrypted/decrypted via one of the non-deterministic encryption/decryption techniques for transport across a channel subject to eavesdropping.

In a non-deterministic encryption scenario, an open-text input stream is received and encrypted, and one or more associated codes for error-correction are generated for the encrypted stream, a correctable amount of non-deterministic random error is injected into the encrypted stream and the associated codes for error-correction, and the encrypted stream and the associated codes for error-correction are encrypted a second time and released to a using process. In a specific embodiment, encryption uses a symmetric block encryption algorithm such as an algorithm compatible with an AES standard. In another embodiment, the first and second encryptions use different symmetric block encryption keys. In some scenarios, encryption uses a stream cipher encryption algorithm. In other scenarios, encryption includes a reversible scrambling layer.

A non-deterministic decryption reverses the process used for encryption. A received encrypted stream and one or more associated encrypted codes for error-correction, together containing a correctable amount of random error, are decrypted. The decrypted codes for error-correction are used to correct the random error, recovering an encrypted cipher-text stream. The cipher-text stream is decrypted to obtain an open-text stream that is released to a using process. In various symmetric encryption/decryption scenarios, the first and second decryptions use copies of the keys previously used to encrypt the received inputs. In some scenarios, the non-deterministic decryption operates upon a stream cipher. In some scenarios, an unscrambling layer reverses the scrambling introduced in a scrambled encryption scenario.

In some embodiments, accessing compressed data of varying-sized quanta in NVM provides improved storage efficiency in some usage scenarios. For example, an SSD controller receives (uncompressed) data from a computing host (e.g., relating to a disk write command), compresses the data, and stores the compressed data into flash memory. In response to a subsequent request from the computing host (e.g., relating to a disk read command), the SSD controller reads the compressed data from the flash memory, uncompresses the compressed data, and provides the uncompressed data to the computing host. The compressed data is stored in the flash memory according to varying-sized quanta, the quanta size varying due to, e.g., compression algorithm, operating mode, and compression effectiveness on various data. The SSD controller uncompresses the data in part by consulting an included map table to determine where header (s) are stored in the flash memory. The SSD controller parses the header(s) obtained from the flash memory to determine where appropriate (compressed) data is stored in the flash memory. The SSD controller uncompresses the appropriate data from the flash memory to produce the uncompressed data to provide to the computing host. In the instant application, uncompress (and variants thereof) is synonymous with decompress (and variants thereof).

In various embodiments, an SSD controller includes a host interface for interfacing with a computing host, a flash interface for interfacing with flash memory, and circuitry for controlling the interfaces and performing (and/or controlling various aspects of the performing) compressing and uncompressing, as well as lower-level error correction, higher-level error correction, and dynamic higher-level redundancy mode management with independent silicon elements.

According to various embodiments, some host interfaces are compatible with one or more of a USB interface standard, a CF interface standard, an MMC interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a PC, a laptop computer, a notebook computer, a netbook computer, a PDA, a media player, a media recorder, a digital camera, a cellular handset, a cordless telephone handset, and an electronic game. In some embodiments, an interfacing host (such as an SAS/SATA bridge) operates as a computing host and/or as a bridge to a computing host.

According to various embodiments, some SSDs are compatible with form-factors, electrical interfaces, and/or protocols used by magnetic and/or optical non-volatile storage, such as HDDs, CD drives, and DVD drives. In various embodiments, SSDs use various combinations of zero or more parity codes, zero or more RS codes, zero or more BCH codes, zero or more Viterbi or other trellis codes, and zero or more LDPC codes.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A method comprising:
  encrypting data;
  generating error-correction information to enable error correction of the encrypted data;
  injecting non-deterministic random error into a combination of the encrypted data and the error-correction information;
  re-encrypting the error-injected combination; and
  wherein the error-correction information is sufficient to at least correct the injected non-deterministic random error.

EC2) The method of EC1, wherein the error-injected combination comprises zero or more concatenations and zero or more permutations of the encrypted data and the error-correction information.

EC3) The method of EC1, further comprising scrambling the error-injected combination before the injecting.

EC4) The method of EC1, further comprising scrambling the error-injected combination before the re-encrypting.

EC5) The method of EC1, further comprising scrambling and/or modulating at least some results of the re-encrypting.

EC6) The method of EC1, wherein the injecting comprises injecting a correctable, non-deterministic random error into the encrypted data and forming a concatenation and/or permutation of the error-injected encrypted data and the error-correction information.

EC7) The method of EC1, wherein the encrypting and the re-encrypting employ a shared encryption standard.

EC8) The method of EC7, wherein the shared standard comprises one of AES128, AES192, and AES256.

EC9) The method of EC7,
  wherein encryption keys used by the encrypting and the re-encrypting have different values.

EC10) The method of EC9,
  further comprising saving the key values to a data store.

EC11) The method of EC1, wherein at least one of the encrypting and the re-encrypting comprise one or more asymmetric encryption operations.

EC12) The method of EC1, wherein at least one of the encrypting and the re-encrypting comprise one or more symmetric encryption operations.

EC13) The method of EC1, wherein at least some of the error-correction information comprises one or more of a CRC code; a Hamming code; a SECDED code; an RS code; a turbo code, a BCH code; an LDPC code; a Viterbi code; a trellis code; a hard-decision code; a soft-decision code; an erasure-based code; any error detecting and/or correcting code; and any combination of the preceding.

EC14) The method of EC1, wherein a span of the encrypted data covered by one of one or more codes comprising the error-correction information is a same size as an encryption block of the encrypted data.

EC15) The method of EC1, wherein a span of the encrypted data covered by one of one or more codes comprising the error-correction information is a different size than an encryption block of the encrypted data.

EC16) The method of EC1, wherein at least one encryption block of the re-encrypted data comprises a portion less than all of an encryption block of the encrypted data and a portion less than all of the error-correction information.

EC17) The method of EC1, wherein the encrypting is a first encrypting and further comprising a second encrypting of at least some results of the re-encrypting.

EC18) The method of EC1, further comprising preparing at least some results of the re-encrypting to enable storing in one or more non-volatile memories.

EC19) The method of EC18, further comprising the storing.

EC20) The method of EC19, wherein the storing is via a flash memory interface.

EC21) The method of EC1, wherein the encrypting data comprises receiving open-text from a computing host at least in part via a storage interface compatible with a storage interface standard.

EC22) The method of EC1, wherein the injected error further comprises a non-deterministic random error.

EC23) The method of EC1, wherein the encrypting, the generating, the injecting, and the re-encrypting are implemented, at least in part, via a controller of a Solid-State Disk (SSD).

EC24) A method comprising:
receiving open-text data from a computing host;
processing the received data according to the following sequence of operations encrypting the received data,
generating one or more codes for error-correction of the encrypted data,
injecting a correctable, non-deterministic random error into a combination of the encrypted data and the code for error-correction,
re-encrypting the error-injected combination to produce re-encrypted data, and
providing the re-encrypted data as results of the processing; and
preparing the results of the processing to enable storing in one or more non-volatile memories.

EC25) The method of EC24, wherein the error-injected combination comprises one or more concatenations and/or one or more permutations of the encrypted data and the codes for error-correction.

EC26) The method of EC24, further comprising scrambling the error-injected combination before the injecting.

EC27) The method of EC24, further comprising scrambling the error-injected combination before the re-encrypting.

EC28) The method of EC24, further comprising scrambling the re-encrypted data before the providing.

EC29) The method of EC24, wherein the injecting comprises injecting a correctable, non-deterministic random error into the encrypted data and forming a concatenation and/or permutation of the error-injected encrypted data and the codes for error-correction.

EC30) The method of EC24, wherein the encrypting and the re-encrypting employ a shared encryption standard.

EC31) The method of EC30, wherein the shared standard comprises one of AES128, AES192, and AES256.

EC32) The method of EC30,
wherein encryption keys used by the encrypting and the re-encrypting have different values.

EC33) The method of EC32, further comprising saving the key values to a data store.

EC34) The method of EC24, wherein at least one of the encrypting and the re-encrypting comprise one or more asymmetric encryption operations.

EC35) The method of EC24, wherein at least one of the encrypting and the re-encrypting comprise one or more symmetric encryption operations.

EC36) The method of EC24, wherein the one or more codes comprise one or more of a CRC code; a Hamming code; a SECDED code; an RS code; a turbo code, a BCH code; an LDPC code; a Viterbi code; a trellis code; a hard-decision code; a soft-decision code; an erasure-based code; any error detecting and/or correcting code; and any combination of the preceding.

EC37) The method of EC24, wherein a span of the encrypted data covered by one of the one or more codes is a same size as an encryption block of the encrypted data.

EC38) The method of EC24, wherein a span of the encrypted data covered by one of the one or more codes is a different size than an encryption block of the encrypted data.

EC39) The method of EC24, wherein at least one encryption block of the re-encrypted data comprises a portion less than all of an encryption block of the encrypted data and a portion less than all of the one or more codes.

EC40) The method of EC24, wherein the preparing comprises scrambling and/or modulating the results of the processing.

EC41) The method of EC24, wherein the encrypting is a first encrypting and wherein the preparing comprises a second encrypting.

EC42) The method of EC24, further comprising the storing.

EC43) The method of EC42, wherein the storing is via a flash memory interface.

EC44) The method of EC24, wherein the receiving is via a storage interface compatible with a storage interface standard.

EC45) The method of EC24, wherein the injected error further comprises a non-deterministic random error.

EC46) The method of EC24, wherein the encrypting, the generating, the injecting, and the re-encrypting are implemented, at least in part, via a controller of a Solid-State Disk (SSD).

EC47) A method comprising:
receiving data from one or more non-volatile memories;
preparing the received data;
processing the prepared data according to the following sequence of operations decrypting the prepared data,
partitioning the decrypted data into a data portion and one or more codes for error-correction,
error correcting the data portion using the codes for error-correction,
re-decrypting the error corrected data portion, and
providing the re-decrypted data as the results of the processing; and
providing the results of the processing to a computing host.

EC48) The method of EC47, further comprising un-scrambling the prepared data and decrypting the un-scrambled data.

EC49) The method of EC47, further comprising un-scrambling the decrypted data and partitioning the un-scrambled data.

EC50) The method of EC47, wherein the preparing comprises decrypting.

EC51) The method of EC47, wherein the results provided to the computing host are formatted as open-text.

EC52) The method of EC47, wherein the decrypting and the re-encrypting operations employ a shared encryption standard.

EC53) The method of EC52, wherein the shared standard comprises one of AES128, AES192, and AES256.

EC54) The method of EC53, wherein the decryption keys used by the decryption and the re-decryption operations have different values.

EC55) The method of EC54, further comprising retrieving the key values from a data store.

EC56) A method comprising:
receiving data from a computing host;

processing the received data according to the following sequence of operations encrypting the received data,
    generating one or more codes for error-correction for the encrypted data,
    combining a local current count with the one or more codes for error-correction,
    injecting a correctable random error into a combination of the encrypted data along with the combination of the local current count and the codes for error-correction,
    re-encrypting the error-injected combination, and
    providing the re-encrypted data as the results of the processing; and
preparing the results of the processing to enable storing in one or more non-volatile memories.

EC57) The method of EC56, wherein the at least one of the codes is according to the local current count.

EC58) The method of EC56, wherein the combination of the encrypted data along with the combination of the local current count and the codes for error-correction comprises one or more concatenations and/or one or more permutations of the encrypted data, the local current count, and the codes for error-correction.

EC59) The method of EC56, further comprising initializing the local current count and saving the initialized current count value to a data store.

EC60) The method of EC56, wherein the received data has an open-text format.

EC61) The method of EC56, wherein the preparing comprises encryption.

EC62) The method of EC56, wherein the encrypting and the re-encrypting operations employ a shared encryption standard.

EC63) The method of EC62, wherein the shared standard comprises one of AES128, AES192, and AES256.

EC64) The method of EC63, wherein the encryption keys used for the encrypting and the re-encrypting operations have different values.

EC65) The method of EC64, further comprising saving the values for the encryption keys to a data store.

EC66) A method comprising:
receiving data from one or more non-volatile memories;
preparing the received data;
processing the prepared data according to the following sequence of operations decrypting the prepared data,
    partitioning the decrypted data into a data portion and a combination of a stored current count and one or more codes for error-correction,
    combining a local current count with the combination to retrieve the codes for error-correction,
    error correcting the data portion using the codes for error-correction,
    re-decrypting the error corrected data portion, and
    providing the re-decrypted data as the results of the processing; and
providing the results of the processing to a computing host.

EC67) The method of EC66, further comprising retrieving a saved value of an initialized local current count from a data store, and initializing the stored current count with the retrieved value.

EC68) The method of EC66, wherein the preparing comprises decrypting.

EC69) The method of EC66, wherein the results provided to the computing host are formatted as open-text.

EC70) The method of EC66, wherein the decrypting and the re-decrypting operations employ a shared encryption standard.

EC71) The method of EC70, wherein the shared standard comprises one of AES128, AES192, and AES256.

EC72) The method of EC71, wherein the decryption keys used for the decryption and the re-decryption operations have different values.

EC73) The method of EC72, further comprising retrieving the key values from a data store.

EC74) A system comprising:
a means for receiving data from a computing host;
a means for encrypting the received data;
a means for generating one or more codes for error-correction for the encrypted data;
a means for injecting a correctable random error into a combination of the encrypted data and the codes for error-correction;
a means for re-encrypting the error-injected combination; and
a means for preparing the re-encrypted data to enable storing in one or more non-volatile memories.

EC75) The system of EC74, wherein the combination of the encrypted data and the codes for error-correction comprises one or more concatenations and/or one or more permutations of the encrypted data and the codes for error-correction.

EC76) The system of EC74, wherein the correctable random error is non-deterministic.

EC77) The system of EC74, wherein the preparing means comprises encryption.

EC78) The system of EC74, wherein the preparing means comprises means for scrambling and/or modulating the re-encrypted data.

EC79) The system of EC74, wherein the means are via a controller of a Solid-State Disk (SSD), and the non-volatile memories are flash memories comprised in the SSD.

EC80) The system of EC79, further comprising a means for interfacing the controller with the computing host.

EC81) The system of EC80, wherein the means for interfacing is compatible with a storage interface standard.

EC82) The system of EC80, further comprising all or any portions of the computing host.

EC83) The system of EC74, further comprising a means for interfacing with the non-volatile memories.

EC84) The system of EC83, wherein the means for interfacing comprises a flash memory interface.

EC85) The system of EC74, further comprising at least one of the non-volatile memories.

EC86) The system of EC74, further comprising:
a means for interfacing requests from the computing host, the requests relating to information stored in the non-volatile memories; and
a means for interfacing to the non-volatile memories.

EC87) The system of EC86, wherein the means are collectively implemented in a single Integrated Circuit (IC).

EC88) The system of EC86, wherein the means are comprised in a Solid-State Disk (SSD).

EC89) A method comprising:
encrypting data;
generating one or more codes for error-correction suitable to correct a correctable non-deterministic error with respect to results of the encrypting; and
injecting a correctable non-deterministic error into a combination of the results and the codes for error-correction.

EC90) The method of EC89, wherein the encrypting, the generating, and the injecting are at least in part via a controller of an input/output device.

EC91) The method of EC89, wherein the encrypting, the generating, and the injecting are at least in part via a controller of a storage device.

EC92) The method of EC91, wherein the storage device comprises a Solid-State Disk (SSD), and the SSD comprises one or more non-volatile memories.

EC93) The method of EC89, further comprising re-encrypting the combination.

EC94) The method of EC93, wherein the encrypting, the generating, the injecting, and the re-encrypting are at least in part via a controller of an input/output device.

EC95) The method of EC93, wherein the encrypting, the generating, the injecting, and the re-encrypting are at least in part via a controller of a storage device.

EC96) The method of EC95, wherein the storage device comprises a Solid-State Disk (SSD), and the SSD comprises one or more non-volatile memories.

EC97) The method of EC93, further comprising formatting results of the re-encrypting to be compatible with storage in one or more non-volatile memories (NVMs).

EC98) The method of EC97, wherein the encrypting, the generating, the injecting, the re-encrypting, and the formatting are at least in part via a controller of an input/output device.

EC99) The method of EC93, wherein the encrypting, the generating, the injecting, the re-encrypting, and the formatting are at least in part via a controller of a storage device.

EC100) The method of EC99, wherein the storage device comprises a Solid-State Disk (SSD), and the SSD comprises the NVMs.

EC101) The method of EC97, further comprising receiving the data from a computing host.

EC102) The method of EC101, wherein the encrypting, the generating, the injecting, the re-encrypting, the formatting, and the receiving are at least in part via a controller of an input/output device.

EC103) The method of EC101, wherein the encrypting, the generating, the injecting, the re-encrypting, the formatting, and the receiving are at least in part via a controller of a storage device.

EC104) The method of EC103, wherein the storage device comprises a Solid-State Disk (SSD), and the SSD comprises the NVMs.

EC105) The method of EC89, wherein the combination comprises
- zero or more concatenations of zero or more portions of the results and zero or more portions of the codes for error-correction, and
- zero or more permutations of zero or more portions of the results and zero or more portions of the codes for error-correction.

Any of the applicable foregoing ECs, wherein the acts of decrypting, error correcting, and re-encrypting are performed within a secure physical boundary.

Any of the applicable foregoing ECs, wherein the acts of encrypting, generation of code(s) for error-correction, error injection, and re-encryption are performed within a secure physical boundary.

Any of the applicable foregoing ECs, wherein the secure physical boundary is implemented via a single Integrated Circuit (IC).

Any of the applicable foregoing ECs, further comprising encryption keys being compatible with symmetric key encryption/decryption.

Any of the applicable foregoing ECs, wherein the symmetric key encryption/decryption is compatible with one or more of
- AES 128,
- AES 192, and
- AES 256.

Any of the applicable foregoing ECs, wherein the SSD controller is implemented in a single Integrated Circuit (IC).

Any of the applicable foregoing ECs, wherein the SSD controller and the non-volatile memories are comprised in an SSD.

Any of the applicable foregoing ECs, wherein at least one of the non-volatile memories comprises one or more flash memories.

Any of the applicable foregoing ECs, wherein at least one of the flash memories comprises one or more of
- NAND flash technology storage cells, and
- NOR flash technology storage cells.

Any of the applicable foregoing ECs, wherein at least one of the flash memories comprises one or more of
- Single-Level Cell (SLC) flash technology storage cells, and
- Multi-Level Cell (MLC) flash technology storage cells.

Any of the applicable foregoing ECs, wherein the flash memory interface is compatible with one or more of
- an Open NAND Flash Interface (ONFI),
- a Toggle-mode interface,
- a Dual Data Rate (DDR) synchronous interface,
- a synchronous interface, and
- an asynchronous interface.

Any of the applicable foregoing ECs, wherein the storage interface standard comprises one or more of
- a Universal Serial Bus (USB) interface standard,
- a Compact Flash (CF) interface standard,
- a MultiMediaCard (MMC) interface standard,
- a Secure Digital (SD) interface standard,
- a Memory Stick interface standard,
- an xD-picture card interface standard,
- an Integrated Drive Electronics (IDE) interface standard,
- a Serial Advanced Technology Attachment (SATA) interface standard,
- an external SATA (eSATA) interface standard,
- a Small Computer System Interface (SCSI) interface standard,
- a Serial Attached Small Computer System Interface (SAS) interface standard,
- a Fibre Channel interface standard,
- an Ethernet interface standard, and
- a Peripheral Component Interconnect express (PCIe) interface standard.

Any of the applicable foregoing ECs, wherein the computing host comprises one or more of
- a computer,
- a workstation computer,
- a server computer,
- a storage server,
- a Personal Computer (PC),
- a laptop computer,
- a notebook computer,
- a netbook computer,
- a Personal Digital Assistant (PDA),
- a media player,
- a media recorder,
- a digital camera,
- a cellular handset,
- a cordless telephone handset, and
- an electronic game.

Additional ECs are contemplated, including apparatus, system, method, means-plus-function, and computer readable medium analogs and/or variations of all or any portions of the foregoing ECs.

System

FIG. 1A illustrates selected details of an embodiment of SSD 101 including an SSD controller using a non-deterministic encryption/decryption engine for managing non-volatile storage, such as implemented via NVM elements (e.g., flash memories). SSD controller 100 is communicatively coupled via one or more external interfaces 110 to a host (not illustrated). According to various embodiments, external interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD controller 100 includes a SATA interface and a PCIe interface.

SSD controller 100 is further communicatively coupled via one or more device interfaces 190 to NVM 199 including one or more storage devices, such as flash devices 192. According to various embodiments, device interfaces 190 are one or more of: an asynchronous interface; a synchronous interface; a DDR synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Flash devices 192 have, in some embodiments, one or more individual flash die 194. According to type of a particular one of flash devices 192, a plurality of flash die 194 in the particular flash device 192 are optionally and/or selectively accessible in parallel. Flash devices 192 are merely representative of one type of storage device enabled to communicatively couple to SSD controller 100. In various embodiments, any type of storage device is usable, such as an SLC NAND flash memory, MLC NAND flash memory, NOR flash memory, read-only memory, static random access memory, dynamic random access memory, ferromagnetic memory, phase-change memory, racetrack memory, or any other type of memory device or storage medium.

According to various embodiments, device interfaces 190 are organized as: one or more busses with one or more flash devices 192 per bus; one or more groups of busses with one or more flash devices 192 per bus, where busses in a group are generally accessed in parallel; or any other organization of flash devices 192 onto device interfaces 190.

Continuing in FIG. 1A, SSD controller 100 has one or more modules, such as host interface 111, data processing 121, non-deterministic encryption/decryption engine 125, buffer 131, map 141, recycler 151, ECC 161, device interface logic 191, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more host interfaces 111 to provide dual-porting. In a second example, in some embodiments, data processing 121 and/or ECC 161 are combined with buffer 131. In a third example, in some embodiments, host interfaces 111 is directly coupled to buffer 131, and data processing 121 optionally and/or selectively operates on data stored in buffer 131. In a fourth example, in some embodiments, device interface logic 191 is directly coupled to buffer 131, and ECC 161 optionally and/or selectively operates on data stored in buffer 131. In a fifth example, in some embodiments, data processing 121 is coupled to non-deterministic encryption/decryption engine 125.

Host interface 111 sends and receives commands and/or data via external interface 110, and, in some embodiments, tracks progress of individual commands via tag tracking 113. For example, the commands include a read command specifying an address (such as an LBA) and an amount of data (such as a number of LBA quanta, e.g., sectors) to read; in response the SSD provides read status and/or read data. For another example, the commands include a write command specifying an address (such as an LBA) and an amount of data (such as a number of LBA quanta, e.g., sectors) to write; in response the SSD provides write status and/or requests write data and optionally subsequently provides write status. For yet another example, the commands include a de-allocation command specifying one or more addresses (such as one or more LBAs) that no longer need be allocated; in response the SSD modifies the map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, host interface 111 is compatible with a SATA protocol and, using NCQ commands, is enabled to have up to 32 pending commands, each with a unique tag represented as a number from 0 to 31. In some embodiments, tag tracking 113 is enabled to associate an external tag for a command received via external interface 110 with an internal tag used to track the command during processing by SSD controller 100.

According to various embodiments, one or more of: data processing 121 optionally and/or selectively processes some or all data sent between buffer 131 and external interfaces 110; and data processing 121 optionally and/or selectively processes data stored in buffer 131. In some embodiments, data processing 121 uses one or more engines 123 to perform one or more of: formatting; reformatting; transcoding; and any other data processing and/or manipulation task, including some or all tasks performed by non-deterministic encryption/decryption engine 125.

In other embodiments, non-deterministic encryption/decryption engine 125 performs a non-deterministic encryption of data being processed for storage in NVM and/or decryption of data being processed after retrieval from NVM.

Buffer 131 stores data sent to/from external interfaces 110 from/to device interfaces 190. In some embodiments, buffer 131 additionally stores system data, such as some or all map tables, used by SSD controller 100 to manage flash devices 192. In various embodiments, buffer 131 has one or more of: memory 137 used for temporary storage of data; DMA 133 used to control movement of data to and/or from buffer 131; and ECC-X 135 used to provide higher-level error correction and/or redundancy functions; and other data movement and/or manipulation functions. An example of a higher-level redundancy function is a RAID-like capability, where redundancy is at a flash device (e.g., multiple ones of flash devices 192) level and/or a flash die (e.g., flash die 194) level instead of at a disk level.

According to various embodiments, one or more of: ECC 161 optionally and/or selectively processes some or all data sent between buffer 131 and device interfaces 190; and ECC 161 optionally and/or selectively processes data stored in buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; a SECDED code, an RS code; a turbo code, a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device interface logic 191 controls flash devices 192 via device interfaces 190. Device interface logic 191 is enabled to send data to/from flash devices 192 according to a protocol of flash devices 192. Device interface logic 191 includes scheduling 193 to selectively sequence control of flash devices 192 via device interfaces 190. For example, in some embodiments, scheduling 193 is enabled to queue operations to flash devices 192, and to selectively send the operations to individual ones of flash devices 192 (or flash die 194) as individual flash devices 192 (or flash die 194) are available.

Map 141 converts between data addressing used on external interfaces 110 and data addressing used on device interfaces 190, using table 143 to map external data addresses to locations in NVM 199. For example, in some embodiments, map 141 converts LBAs used on external interfaces 110 to block and/or page addresses targeting one or more flash die 194, via mapping provided by table 143. For LBAs that have never been written since drive manufacture or de-allocation, the map points to a default value to return if the LBAs are read. For example, when processing a de-allocation command, the map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command/primitive arguments/parameters, programmable registers, or various combinations thereof.

In some embodiments, recycler 151 performs garbage collection. For example, in some embodiments, flash devices 192 contain blocks that must be erased before the blocks are re-writeable. Recycler 151 is enabled to determine which portions of flash devices 192 are actively in use (e.g., allocated instead of de-allocated), such as by scanning a map maintained by map 141, and to make unused (e.g., de-allocated) portions of flash devices 192 available for writing by erasing them. In further embodiments, recycler 151 is enabled to move data stored within flash devices 192 to make larger contiguous portions of flash devices 192 available for writing.

CPU 171 controls various portions of SSD controller 100. CPU 171 includes CPU core 172. CPU core 172 is, according to various embodiments, one or more single-core or multi-core processors. The individual processors cores in CPU core 172 are, in some embodiments, multi-threaded. CPU core 172 includes instruction and/or data caches and/or memories. For example, the instruction memory contains instructions to enable CPU core 172 to execute software (sometimes called firmware) to control SSD controller 100. In some embodiments, some or all of the firmware executed by CPU core 172 is stored on flash devices 192.

In various embodiments, CPU 171 further includes: command management 173 to track and control commands received via external interfaces 110 while the commands are in progress; buffer management 175 to control allocation and use of buffer 131; translation management 177 to control map 141; coherency management 179 to control consistency of data addressing and to avoid conflicts such as between external data accesses and recycle data accesses; device management 181 to control device interface logic 191; and optionally other management units. None, any, or all of the management functions performed by CPU 171 are, according to various embodiments, controlled and/or managed by hardware, by software (such as software executing on CPU core 172 or on a host connected via external interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD controller 100 and is compatible with operation with various computing hosts, such as via adaptation of host interface 111 and/or external interface 110. The various computing hosts include one or any combination of a computer, a workstation computer, a server computer, a storage server, a PC, a laptop computer, a notebook computer, a netbook computer, a PDA, a media player, a media recorder, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, buffer 131 is implemented on a same die as other elements of SSD controller 100. For another example, buffer 131 is implemented on a different die than other elements of SSD controller 100.

Figure 1B:
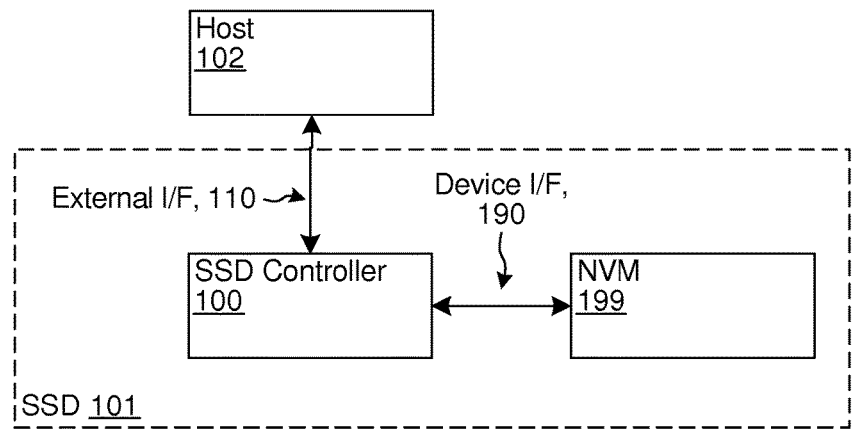
FIG. 1B illustrates selected details of an embodiment of a system including the SSD of FIG. 1A.

FIG. 1B illustrates selected details of an embodiment of a system including the SSD of FIG. 1A. SSD 101 includes SSD controller 100 coupled to NVM 199 via device interfaces 190. The SSD is coupled to host 102 via external interfaces 110. In some embodiments, SSD 101 (or variations thereof) corresponds to a SAS drive or a SATA drive that is coupled to an initiator operating as host 102.

Figure 1C:
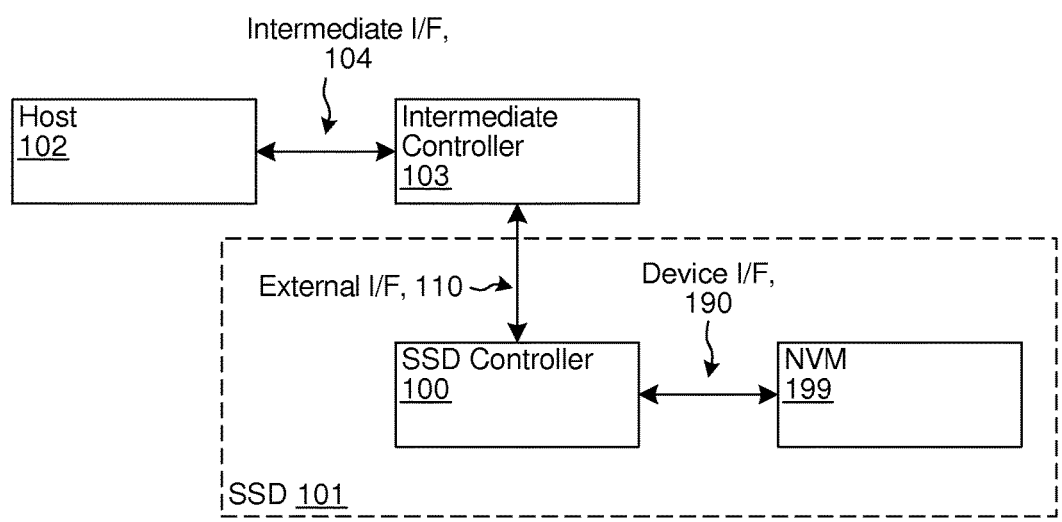
FIG. 1C illustrates selected details of an embodiment of a system including the SSD of FIG. 1A.

FIG. 1C illustrates selected details of an embodiment of a system including the SSD of FIG. 1A. As in FIG. 1B, SSD 101 includes SSD controller 100 coupled to NVM 199 via device interfaces 190. The SSD is coupled to host 102 via external interfaces 110 in turn coupled to intermediate controller 103 and then to host 102 via intermediate interfaces 104. In various embodiments, SSD controller 100 is coupled to the host via one or more intermediate levels of other controllers, such as a RAID controller. In some embodiments, SSD 101 (or variations thereof) corresponds to a SAS drive or a SATA drive and intermediate controller 103 corresponds to an expander that is in turn coupled an initiator, or alternatively intermediate controller 103 corresponds to a bridge that is indirectly coupled to an initiator via an expander.

In various embodiments, an SSD controller and/or a computing-host flash memory controller in combination with one or more NVMs are implemented as a non-volatile storage component, such as a USB storage component, a CF storage component, an MMC storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., host 102 of FIG. 1C). In various embodiments, all or any portions of an SSD controller (or a computing-host flash memory controller), or functions thereof, are implemented via hardware (e.g., logic circuitry), software (e.g., driver program), or any combination thereof. For example, functionality of or associated with an ECC unit (such as similar to ECC 161 and/or ECC-X 135 of FIG. 1A) is implemented partially via software on a host and partially via hardware in an SSD controller. For another example, functionality of or associated with a recycler unit (such as similar to recycler 151 of FIG. 1A) is implemented partially via software on a host and partially via hardware in a computing-host flash memory controller.

Non-Deterministic Encryption/Decryption Engine Embodiments

Figure 2A:
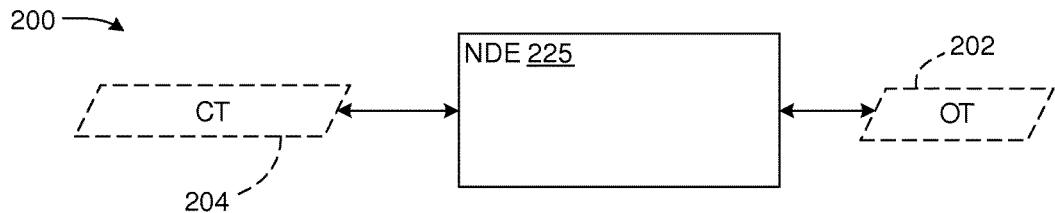
FIG. 2A illustrates a non-deterministic encryption/decryption engine NDE, such as illustrated in FIG. 1A, and illustrates a relationship between the engine, an open-text data element and an enlarged cipher-text data element including one or more codes for error-correction that are suitable to correct an injected non-deterministic random error.

FIG. 2A illustrates a non-deterministic encryption/decryption engine, and a relationship between the engine NDE and two data elements: an open-text data element OT, and an enlarged cipher-text data element CT. The engine and data elements are depicted generally by the reference numeral 200, and include open-text data OT 202, and enlarged cipher-text data CT 204, and non-deterministic encryption/decryption engine NDE 225. It should be noted that the non-deterministic encryption/decryption engine NDE 225 produces output cipher-text data CT 204 that is larger than input open-text data 202. The larger data output is sometimes referred to as enlarged cipher-text data CT 204. The engine NDE 225 corresponds to NDE 125 as depicted in FIG. 1A. For simplicity hereafter, the non-deterministic encryption/decryption engine 225 is referred to sometimes as NDE 225.

During data encryption, NDE 225 receives open-text data OT 202 and outputs enlarged cipher-text data CT 204 that includes one or more codes for error-correction.

During a data decryption operation, NDE 225 receives enlarged cipher-text data CT 204, and outputs open-text data OT 202. Thus, in the decryption direction, the output element is smaller than the enlarged size of the input element.

In some embodiments, NDE 225 is implemented in accordance with one or more elements illustrated in FIG. 1A. For example, NDE 125 is an embodiment of NDE 225, where input/output OT 202, and enlarged outputs/input CT 204 are conceptual, as represented in FIG. 1A by, for example, connectivity between NDE 125 and Data Processing 121. In some embodiments, all or any portions of functionality of NDE 225 are implemented in or under control of one or more of: one or more dedicated hardware logic circuitry blocks, one or more embedded processors and associated firmware, and one or more state machines.

In some embodiments, all or any portions of functionality performed by NDE 225 are performed by or under the control of one or more elements of SSD 101 of FIG. 1A. For example, during an encryption operation, open-text input OT 202 is received from host 102 (FIG. 1B) via host interface 111 (FIG. 1A). Input OT 202 includes data from, for instance, file(s), network stream(s), and other data sources. Enlarged output CT 204 is then stored on NVM 199 via device interface 190. During a decryption operation, enlarged input CT 204 is read from NVM 199 via device interface 190. Open-text output OT 202 is then provided to host 102 (FIG. 1B) via host interface 111 (FIG. 1A). Portions of FIG. 1A elements Data Processing 121 in conjunction with portions of Buffer 131 and/or ECC 161 perform all or any portions of processing relating to encryption and/or decryption.

In some of the example embodiments that follow, symmetric block encryption/decryption methods are used, for example AES128, AES 192, and AES 256. For the AES encryption standard, data is received and processed as blocks of 128 bits. Key lengths are 128 bits, 192 bits, and 256 bits, respectively, depending upon the AES standard used. In some block-based encryption embodiments, input open-text is encrypted in blocks, each block encrypted based upon data for a present block, such as without reference to data within preceding blocks. In some stream-based encryption embodiments, input open-text is encrypted as a stream and/or in various portions of respective sizes.

In some embodiments, the encryption/decryption functionalities are performed within a secure physical environment such as provided by implementation within a single integrated circuit.

Some of the following examples illustrate symmetric block embodiments, and for some of the symmetric block embodiments there are corresponding stream embodiments. Some embodiments use symmetric encryption/decryption techniques. Some embodiments use non-symmetric encryption/decryption techniques, such as RSA public-key encryption/decryption techniques.

Some of the following embodiments generate respective one or more codes for error-correction on respective chunks of data. Variously, for some of these embodiments, each of the chunks of data corresponds to a processing unit for block-based encryption/decryption, two or more of the chunks of data correspond to a processing unit for block-based encryption/decryption, and any portion less than one of the chunks corresponds to a processing unit for block-based encryption/decryption. In some embodiments, there is no correspondence between processing unit size with respect to generating one or more codes for error correction, and processing unit size with respect to encryption/decryption, whether block or stream based.

In some examples that follow, a layer designated $AES_2$ employs a block size greater than 128 bits. Though the official AES block size is 128 bits, in some usage scenarios, a Rijndael encryption/decryption standard (a subset of which was adopted by the US as AES128, 192, and 256) has a minimum block size of 128 bits, but can have larger block sizes in increments of 32 bits. Thus, for example, layers designated $AES_2$ have block size of 192 bits in some scenarios (128 bits of error-injected cipher-text plus an additional 64 bits of error-injected code for error-correction). In practice, these Rijndael blocks are sometimes informally referred to as AES blocks, and that informal designation is followed here. Note also that in the following examples, the $AES_1$ designation refers to a standard AES block size of 128 bits. Referring back to FIG. 2A, during encryption, NDE 225 receives open-text OT 202 in chunks of 128 bits each, and outputs enlarged cipher-text CT 204 in chunks that are larger than 128 bits. In the decryption direction, the process is reversed.

Figure 2B:
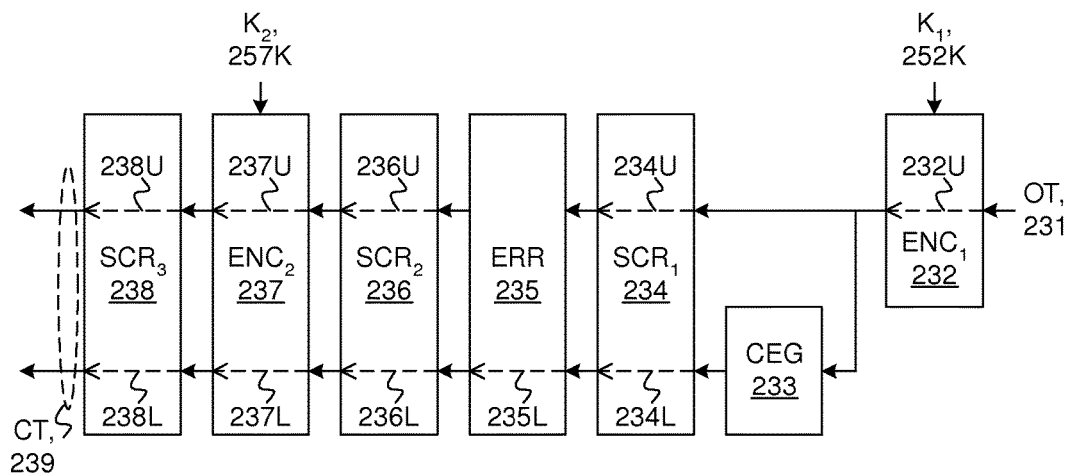
FIGS. 2B and 2C collectively illustrate various embodiments of functionality such as included in the non-deterministic encryption/decryption engine NDE of FIG. 2A.
Figure 2C:
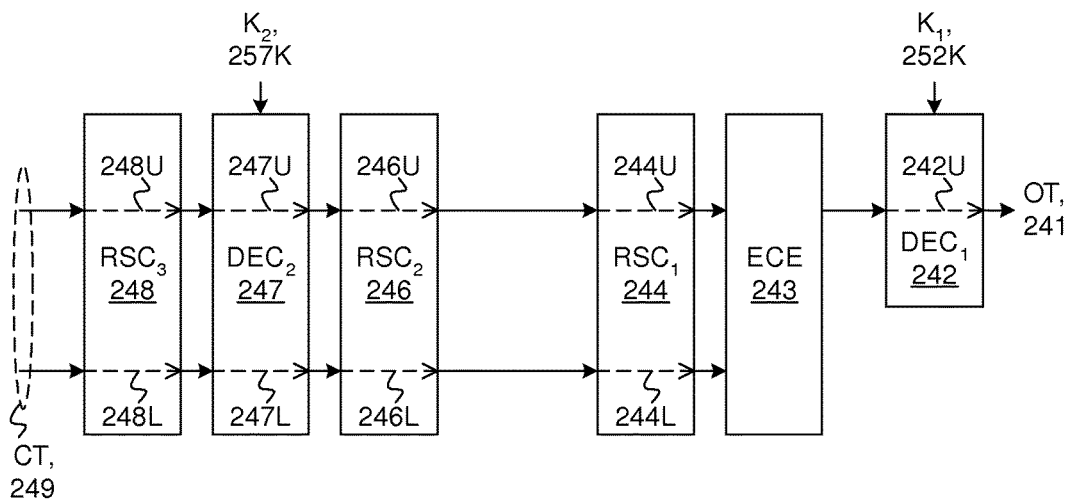

FIGS. 2B and 2C collectively illustrate various embodiments of functionality such as included in non-deterministic encryption/decryption engine NDE 225 of FIG. 2A. FIG. 2B illustrates non-deterministic encryption (e.g. OT to CT) functionality and FIG. 2C illustrates non-deterministic decryption (e.g. CT to OT) functionality (reversing the functionality illustrated by FIG. 2B).

FIG. 2B illustrates selected details of various embodiments of non-deterministic encryption functionality such as included in non-deterministic encryption/decryption engine NDE 225 of FIG. 2A and compatible with reversing by functionality as illustrated by FIG. 2B. The non-deterministic encryption functionality includes input encryption layer $ENC_1$ 232, code for error-correction generation layer CEG 233, input reversible scrambling layer $SCR_1$ 234, error-injection layer ERR 235, internal reversible scrambling layer $SCR_2$ 236, output encryption layer $ENC_2$ 237, and output reversible scrambling layer $SCR_3$ 238.

In operation, input encryption layer $ENC_1$ 232 encrypts input open-text OT 231 using input encryption key $K_1$ 252K, producing cipher-text. Error-correction generation layer CEG 233 generates code for error-correction based on the cipher-text. The cipher-text and the code for error-correction are scrambled by input reversible scrambling layer $SCR_1$ 234. Error-injection layer ERR 235 injects non-deterministic error into results of the input scrambling. Results of the error injection are scrambled by internal reversible scrambling layer $SCR_2$ 236. Results of the internal scrambling are encrypted by output encryption layer $ENC_2$ 237 using output encryption key $K_2$ 257K, producing output cipher-text. The output-cipher text is scrambled by output reversible scrambling layer $SCR_3$ 238. Results of the output scrambling are provided as cipher-text CT 239.

Various embodiments use various respective techniques for encryption/decryption. For example, input encryption layer $ENC_1$ 232 and output encryption layer $ENC_2$ 237 use AES. Various embodiments and/or usage scenarios use different or same key values for the input and output encryption keys $K_1$ 252K and $K_2$ 257K. Various embodiments omit, e.g. "bypass", respective various portions of functionality illustrated in FIG. 2B, as illustrated by dashed-arrows 232U, 234U, 236U, 237U, and 238U, as well as 234L, 235L, 236L, 237L, and 238L. For example, some embodiments optionally and/or selectively omit the input encryption, as illustrated conceptually by dashed-arrow 232U. In some embodiments omitting the input encryption, there is no input encryption layer, while in other embodiments omitting the input encryption layer, the input encryption layer operates to bypass open-text from input to output, omitting encryption processing. For another example, one or more of the scrambling layers are entirely or partially omitted. E.g. the input scrambling layer is omitted entirely, as illustrated conceptually by dashed-arrows 234U and 234L, or omitted partially, as illustrated conceptually by either one of dashed-arrows 234U and 234L.

Figure 3A:
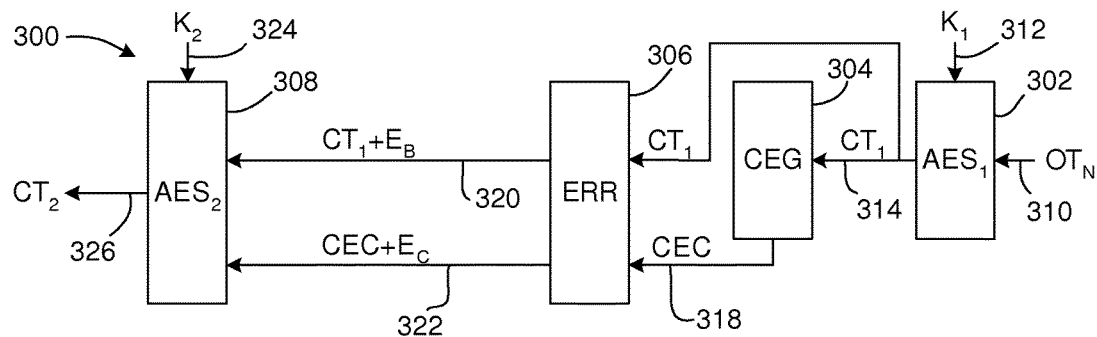
FIG. 3A illustrates selected details of an embodiment of encryption functionality of the non-deterministic encryption/decryption engine NDE of FIG. 2A, and is enabled to encrypt data for subsequent decrypting using the non-deterministic decryption functionality of FIG. 4A.
Figure 3B:
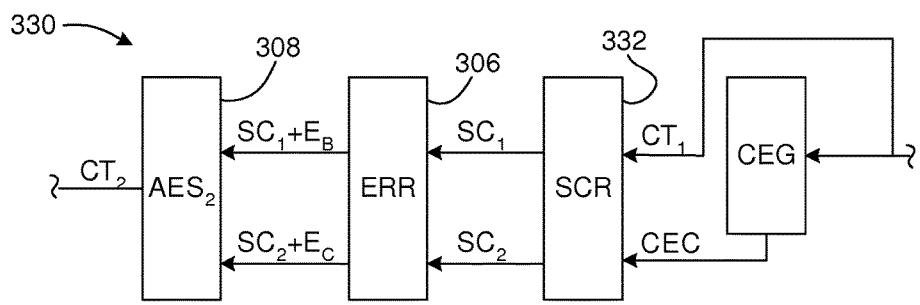
FIG. 3B is a simplified block diagram illustrating a variation of the encryption functionality of FIG. 3A, having a reversible scrambling layer SCR located before error-injection layer ERR, and is enabled to encrypt data for subsequent decrypting using the non-deterministic decryption functionality of FIG. 4B.
Figure 3C:
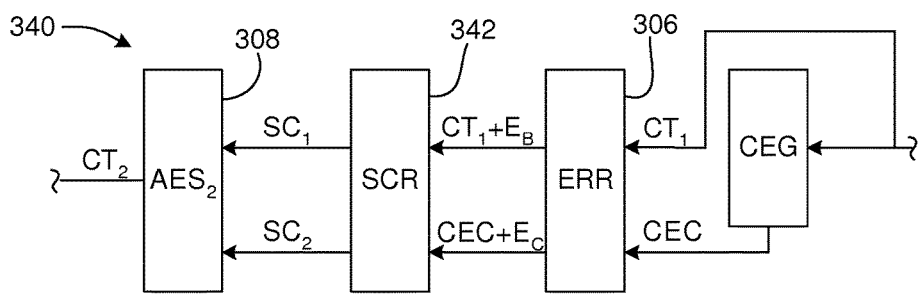
FIG. 3C is a simplified block diagram illustrating a variation of the encryption functionality of FIG. 3A, having a reversible scrambling layer SCR located between error-injection layer ERR and output encryption layer $AES_2$, and is enabled to encrypt data for subsequent decrypting using the non-deterministic decryption functionality of FIG. 4B.
Figure 3D:
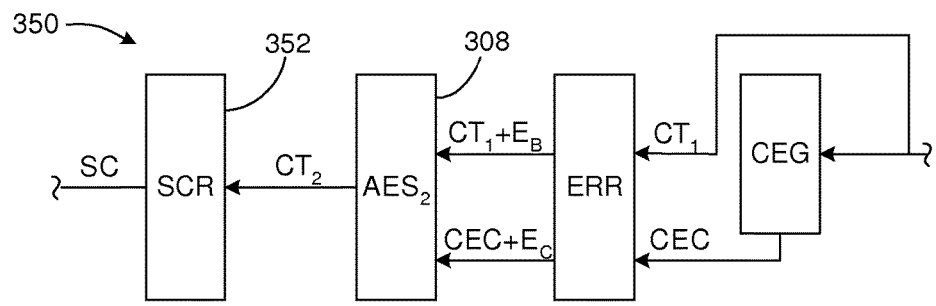
FIG. 3D is a simplified block diagram illustrating a variation of the encryption functionality of FIG. 3A, having a reversible scrambling layer SCR located after output encryption layer $AES_2$, and is enabled to encrypt data for subsequent decrypting using the non-deterministic decryption functionality of FIG. 4C.
Figure 3E:
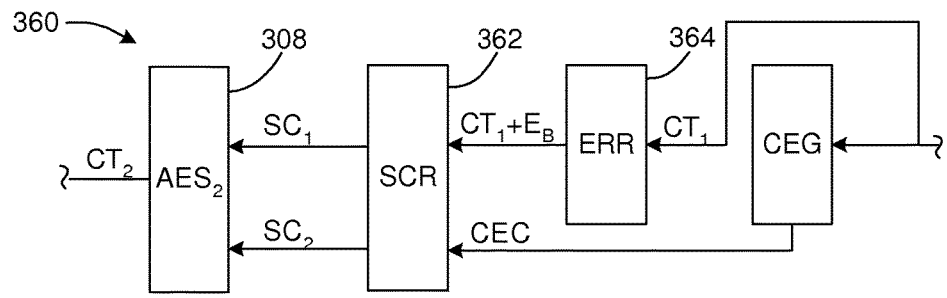
FIG. 3E is a simplified block diagram illustrating a variation of the encryption functionality of FIG. 3A in which non-deterministic random error is injected into internal cipher-text, but not into the code for error-correction, having a reversible scrambling layer SCR located between error-injection layer ERR and output encryption layer $AES_2$, and is enabled to encrypt data for subsequent decrypting using the non-deterministic decryption functionality of FIG. 4B.
Figure 3F:
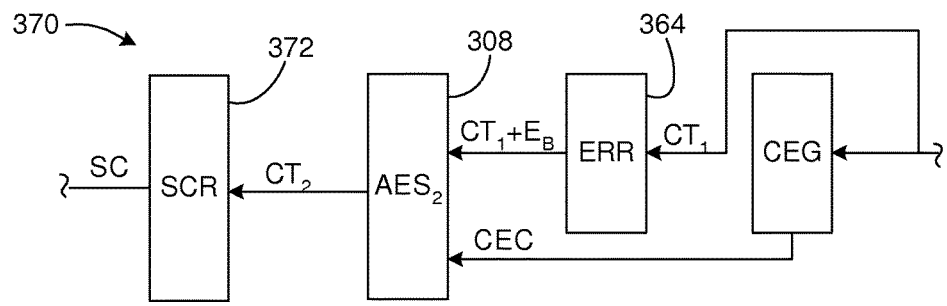
FIG. 3F is a simplified block diagram illustrating a variation of the encryption functionality of FIG. 3A in which non-deterministic random error is injected into internal cipher-text, but not into the code for error-correction, having a reversible scrambling layer SCR located after output encryption layer $AES_2$, and is enabled to encrypt data for subsequent decrypting using the non-deterministic decryption functionality of FIG. 4C.

Several specific examples are illustrated in FIGS. 3A-3F, all using AES for input and output encryption layers $ENC_1$ 232 and $ENC_2$ 237, with each encryption layer having a respective key. FIG. 3A omits all scrambling layers. FIG. 3B includes an internal scrambling layer and is otherwise identical to FIG. 3A. FIG. 3C includes an output scrambling layer and is otherwise identical to FIG. 3A. FIG. 3D includes an output scrambling layer and is otherwise identical to FIG. 3A. FIG. 3E includes an internal scrambling layer and omits error injection of code for error-correction, and is otherwise identical to FIG. 3A. FIG. 3F includes an output scrambling layer and omits error injection of code for error-correction, and is otherwise identical to FIG. 3A. FIGS. 3A-3F are discussed in more detail following.

FIG. 2C illustrates selected details of various embodiments of non-deterministic decryption functionality such as included in non-deterministic encryption/decryption engine NDE 225 of FIG. 2A and compatible with reversing functionality as illustrated by FIG. 2B. The non-deterministic decryption functionality includes input reverse-scrambling layer $RSC_3$ 248, input decryption layer $DEC_2$ 247, internal reverse-scrambling layer $RSC_2$ 246, output reverse-scrambling layer $RSC_1$ 244, injected error-correction layer ECE 243, and output decryption layer $DEC_1$ 242.

In operation, input reverse-scrambling layer $RSC_3$ 248 reverse scrambles input (scrambled) cipher-text CT 249 producing unscrambled cipher-text. The unscrambled cipher-text is decrypted by input decryption layer $DEC_2$ 247 using output encryption key $K_2$ 257K. Results of the decrypting are reverse scrambled by internal reverse-scrambling layer $RSC_2$ 246. Results of the internal reverse-scrambling are reverse scrambled by output reverse-scrambling layer $RSC_1$ 244. Results of the output reverse-scrambling are error-corrected by injected error-correction layer ECE 243. Results of the error-correcting are decrypted by output decryption layer $DEC_1$ 242, using input encryption key $K_1$ 252K, and producing output open-text 241.

Figure 4A:
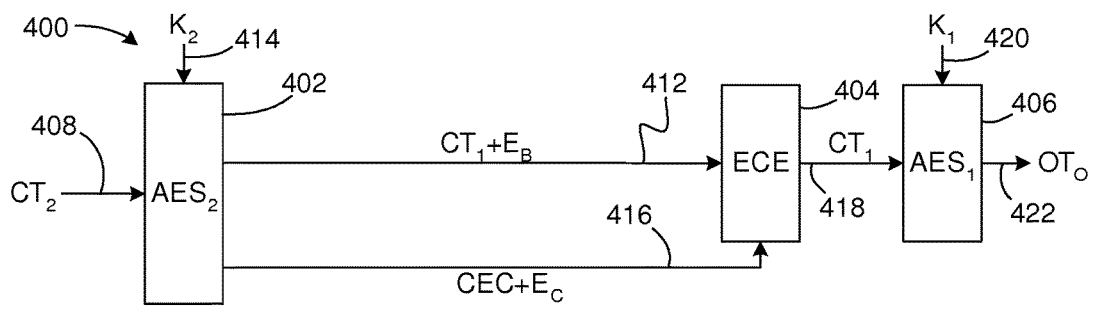
FIG. 4A is a simplified block diagram illustrating selected details of an embodiment of decryption functionality of the non-deterministic encryption/decryption engine NDE of FIG. 2A, and is enabled to decrypt data previously encrypted using the non-deterministic encryption functionality of FIG. 3A.

FIG. 3A illustrates selected details of an embodiment of encryption functionality of the non-deterministic encryption/decryption engine NDE 225 of FIG. 2A, and is enabled to encrypt data for subsequent decrypting using the non-deterministic decryption functionality of FIG. 4A. The non-deterministic encryption functionality is designated generally by the reference numeral 300, and in a specific embodiment includes input encryption layer $AES_1$ 302, code for error-correction generation layer CEG 304, error-injection layer ERR 306, and output encryption layer $AES_2$ 308.

In operation, non-deterministic encryption functionality 300 receives open-text input $OT_N$ 310, that is encrypted by input encryption layer $AES_1$ 302, using input encryption key $K_1$ 312, producing cipher-text $CT_1$ 314.

Code for error-correction generation layer CEG 304 receives cipher-text $CT_1$, and generates code for error-correction CEC 318 for the data contained in cipher-text $CT_1$. Cipher-text $CT_1$ is also an input to error-injection layer ERR 306. In some embodiments, when a code for error-correction is developed for a current portion of cipher-text, the code is generated based upon cipher-text of a current portion only, without reference to cipher-text contained within preceding portions.

In a specific embodiment of non-deterministic encryption functionality 300, cipher-text $CT_1$ 314 and code for error-correction CEC 318 are combined, and the combination is applied to error-injection layer ERR 306. The error-injection layer ERR overlays the combination of $CT_1$ and CEC with an error-mask E to produce error-injected cipher-text $CT_1+E_B$ 320 (where the use of the plus "+" sign represents an overlay operation, such as a binary logic operation, e.g., logical OR, AND, or XOR) and error-injected code for error-correction $CEC+E_C$ 322. Error-mask E includes sub-masks $E_C$ and $E_B$. In various embodiments, the combination of $CT_1$ 314 and CEC 318 is any one of zero or more concatenations and/or zero or more permutations.

In a specific embodiment, output encryption layer $AES_2$ 308 encrypts $CT_1+E_B$ 320 and $CEC+E_C$ 322, using output encryption key $K_2$ 324, to produce enlarged cipher-text output $CT_2$ 326. The block size employed by the informally designated output encryption layer $AES_2$ 308 is large enough to accommodate the combined widths of $CT_1+E_B$ 320 and $CEC+E_C$ 322. The size of error-injected cipher-text $CT_1+E_B$ 320 is 128 bits. In a specific embodiment, the size of $CEC+E_C$ is 64 bits. Thus the output encryption layer $AES_2$ encrypts $CT_1+E_B$ and $CEC+E_C$ as a single, enlarged block of 192 bits.

FIGS. 3B-3F illustrate further examples of non-deterministic encryption functionality similar to the functionality illustrated in FIG. 3A, but each example includes a reversible scrambling layer SCR as an added precaution against eavesdropping.

The purpose of the reversible scrambling layer is to receive a cipher-text data element and its associated code(s) for error-correction, to scramble the individual bits of these elements together in some reversible manner, providing the result as two scrambled data elements $SC_1$ and $SC_2$, respectively. Scrambled data element $SC_1$ corresponds in size to a standard AES data block—128 bits. Scrambled data element $SC_2$ corresponds in size to a code for error-correction—e.g. some integer multiple of 32 bits. In some scenarios, when the code for error-correction is not a multiple of 32 bits, scrambled data element $SC_2$ is padded to such size, as for example with binary zeros. So, for example, if a code for error-correction is 56 bits in length, it is padded to 64 bits by adding 8 zeros to its length. In some embodiments, the reversible scrambling layer produces $SC_1$ and $SC_2$ in a segregated manner such that $SC_1$ is entirely from the standard AES data block and $SC_2$ is entirely from the code for error-correction. In some embodiments, the reversible scrambling layer produces $SC_1$ and $SC_2$ in an intermixed manner such that $SC_1$ are $SC_2$ each include portions of the standard AES data block and the code for error-correction.

Reversible scrambling, as used here, is a mapping function, including techniques such as transposing selected groups of bits, inverting selected groups of bits, exclusive-ORing selected groups of bits with a key, substituting one selected group of bits with another using table lookup, and the like. Reversible scrambling functionality also includes combining some or all of the foregoing techniques. Two example characteristics of reversible scrambling techniques are that each is rapid to perform and is easily reversible. A more complex example of reversible scrambling is AES encryption/decryption.

FIG. 3B is a simplified block diagram illustrating a variation of the non-deterministic encryption functionality of FIG. 3A, and is designated generally by reference numeral 330. Non-deterministic encryption functionality 330 includes reversible scrambling layer SCR 332 located before error-injection layer ERR 306, and is enabled to encrypt data for subsequent decrypting using the non-deterministic decryption functionality of FIG. 4B. Reversible scrambling layer SCR receives cipher-text $CT_1$ and code for error-correction CEC and scrambles together groups of bits selected from each. Layer SCR 332 delivers scrambled data elements $SC_1$ and $SC_2$, each containing some of the bits of each of $CT_1$ and CEC. $SC_1$ is applied to error-injection layer ERR 306 in place of $CT_1$, while $SC_2$ is applied to ERR in place of CEC. Error-injection layer ERR overlays $SC_1$ and $SC_2$ with non-deterministic random error E, and delivers $SC_1+E_B$ and $SC_2+E_C$ to output encryption layer AES2 308. Layer $AES_2$ output enlarged cipher-text $CT_2$ to a using process.

FIG. 3C is a simplified block diagram illustrating another variation of the non-deterministic encryption functionality of FIG. 3A, and is generally designated by reference numeral 340. Non-deterministic encryption functionality 340 includes reversible scrambling layer SCR 342 located between error-injection layer ERR 306 and output encryption layer $AES_2$ 308, and is enabled to encrypt data for subsequent decrypting using the non-deterministic decryption functionality of FIG. 4B.

FIG. 3D is a simplified block diagram illustrating another variation of the non-deterministic encryption functionality of FIG. 3A, and is designated generally by reference numeral 350. Non-deterministic encryption functionality 350 includes reversible scrambling layer SCR 352 located after output encryption layer $AES_2$ 308, and is enabled to encrypt data for subsequent decrypting using the non-deterministic decryption functionality of FIG. 4C. Layer SCR 352 receives enlarged cipher-text $CT_2$ from output encryption layer AES2, scrambles selected portions of $CT_2$ and delivers the scrambled result as enlarged scrambled output SC to a using process.

FIG. 3E is a simplified block diagram illustrating a variation of the encryption functionality of FIG. 3A in which non-deterministic random error is injected into cipher-text $CT_1$ only, but not into the code for error-correction CEC. The non-deterministic encryption functionality is designated generally by the reference numeral 360, and includes reversible scrambling layer SCR 362 located between a standard AES block-size error-injection layer ERR 364 and output encryption layer $AES_2$ 308. Code for error-correction CEC is applied directly to reversible scrambling layer SCR without including injected error. Non-deterministic encryption functionality 360 is enabled to encrypt data for subsequent decrypting using the non-deterministic decryption functionality of FIG. 4B.

FIG. 3F is a simplified block diagram illustrating another variation of the encryption functionality of FIG. 3A in which non-deterministic random error is injected into cipher-text $CT_1$ only, but not into the code for error-correction CEC, and is designated by reference numeral 370. Non-deterministic encryption functionality 370 includes reversible scrambling layer SCR 372 after output encryption layer $AES_2$ 308, and is enabled to encrypt data for subsequent decrypting using the non-deterministic decryption functionality of FIG. 4C.

FIG. 4A is a simplified block diagram illustrating selected details of an embodiment of decryption functionality of the non-deterministic encryption/decryption engine NDE of FIG. 2A, and is designated generally by the reference numeral 400. Non-deterministic decryption functionality 400 includes input decryption layer $AES_2$ 402, injected error-correction layer ECE 404, and output decryption layer $AES_1$ 406. Non-deterministic decryption functionality 400 is an inverse of non-deterministic encryption functionality 300 of FIG. 3A, and is useful for decrypting information previously encrypted using the encryption functionality illustrated in FIG. 3A.

Input decryption layer 402 receives enlarged cipher-text input $CT_2$ 408 (for example, as created by the encryption functionality illustrated in FIG. 3A), and decrypts this input using key $K_2$ 414, producing error-injected cipher-text $CT_1+E_B$ 412 and error-injected code for error-correction $CEC+E_C$ 416. Injected error-correction layer ECE 404 receives error-injected cipher-text $CT_1+E_B$ and error-injected code for error-correction $CEC+E_C$, corrects the injected error, and produces cipher-text $CT_1$ 418, free of injected error. Note: the error being corrected by layer ECE 404 is error that was injected during non-deterministic encryption, as for example by the encryption functionality of FIG. 3A. Output decryption layer $AES_1$ 406 decrypts cipher-text $CT_1$ using key $K_1$ 420 and delivers open-text output $OT_O$ 422.

In a specific example, processing is performed in chunks. The size of the enlarged cipher-text input chunk $CT_2$ is the combined size of a chunk of $CT_1+E_B$ and a chunk of $CEC+E_C$, e.g., 128 bits and 64 bits, respectively. The size of open-text output chunk $OT_O$ is 128 bits. The injected error $E_B$, $E_C$ does not change the length of an error-injected data element, but rather inverts selected bits within a data element. In the specific example, the length of a chunk of $CT_1$ is 128 bits and the length of a chunk of $CT_1+E_B$ is also 128 bits, and the length of a chunk of CEC is 64 bits and the length of a chunk of CEC+$E_C$ is also 64 bits.

Figure 4B:
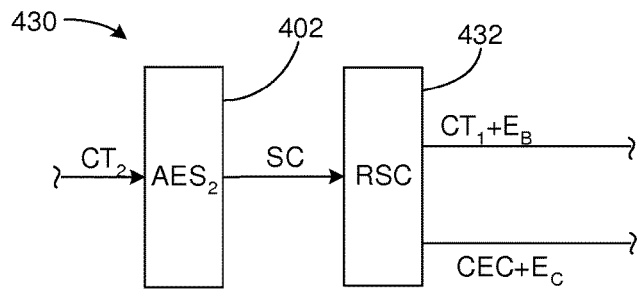
FIG. 4B illustrates selected details of a variation of the decryption functionality of FIG. 4A, having a reverse-scrambling layer RSC located after input decryption layer $AES_2$, and is enabled to decrypt data previously encrypted using the non-deterministic encryption functionality of FIGS. 3B, 3C, and 3E.

FIG. 4B illustrates selected details of a variation of the decryption functionality of FIG. 4A, having a reverse-scrambling layer RSC located after input decryption layer $AES_2$, and is enabled to decrypt data previously encrypted using the non-deterministic encryption functionality of FIGS. 3B, 3C, and 3E.

FIG. 4B is a partial block diagram in which non-deterministic decryption functionality is designated generally by the reference numeral 430 and includes input decryption layer $AES_2$ 402, and reverse-scrambling layer RSC 432. Injected error-correction layer ECE, output decryption layer $AES_1$, and open-text output $OT_O$ are identical to those of FIG. 4A and are not described again here. Input decryption layer $AES_2$ receives enlarged cipher-text input $CT_2$, decrypts it, and provides scrambled data element SC to reverse-scrambling layer RSC 432. Layer RSC reverses the scrambling created during encryption and produces error-injected cipher-text $CT_1+E_B$ and error-injected code for error-correction CEC+$E_C$. These data elements are then processed as illustrated in FIG. 4A to produce open-text output $OT_O$. As in FIG. 4A, in a specific example, processing is performed in chunks.

Figure 4C:
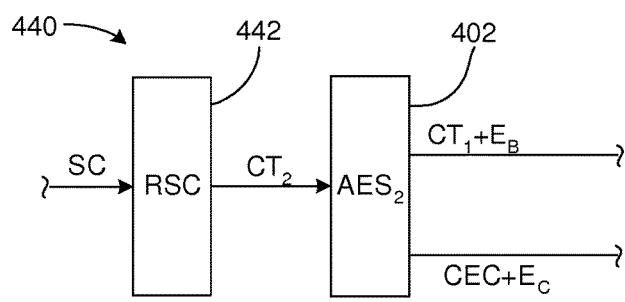
FIG. 4C illustrates selected details of a variation of the decryption functionality of FIG. 4A, having a reverse-scrambling layer RSC located before input decryption layer $AES_2$, and is enabled to decrypt data previously encrypted using the non-deterministic encryption functionality of FIGS. 3D and 3F.

FIG. 4C illustrates selected details of a variation of the non-deterministic decryption functionality of FIG. 4A, having a reverse-scrambling layer RSC located before input decryption layer $AES_2$, and is enabled to decrypt data previously encrypted using the non-deterministic encryption functionality of FIGS. 3D and 3F.

FIG. 4C is a partial block diagram in which non-deterministic decryption functionality is designated generally by the reference numeral 440 and includes reverse-scrambling layer RSC 442, and input decryption layer $AES_2$ 402. Injected error-correction layer ECE, output decryption layer $AES_1$, and open-text output $OT_O$ are identical to those of FIG. 4A. Reverse-scrambling layer RSC 442 receives enlarged scrambled data element SC, reverses the scrambling created during encryption and provides enlarged cipher-text input data $CT_2$ to input decryption layer $AES_2$ 402. Input decryption layer $AES_2$ decrypts $CT_2$ to produce $CT_1+E_B$ and CEC+$E_C$. These data elements are then processed as illustrated in FIG. 4A to produce open-text output $OT_O$. As in FIGS. 4A and 4B, in a specific example, processing is performed in chunks.

In some embodiments and/or usage scenarios, all or any portions of processing performed by CEG 304 (FIGS. 3A-3F) and/or ECE 404 (FIGS. 4A-4C) are performed by all or any portions of ECC 161 (FIG. 1A), and/or by one or more elements having functionality similar to ECC 161 and operable wholly or partially in parallel with ECC 161. For example, code for error-correction generation as performed by CEG 304 as well as injected error correction as performed by ECE 404, are performed by multiplexing use of ECC 161. For another example, a dedicated hardware block implementing at least the ECC techniques implemented by ECC 161 as performed by CEG 304 performs code for error-correction generation. A dedicated hardware block implementing at least the ECC techniques implemented by ECC 161 as performed by ECE 404 performs injected error correction. The code for error-correction generation and injected error correction dedicated hardware blocks are operable wholly in parallel with each other and ECC 161, limited only by access to mutually required resources (e.g. data to/from non-volatile memory and/or a host).

Figure 5A:
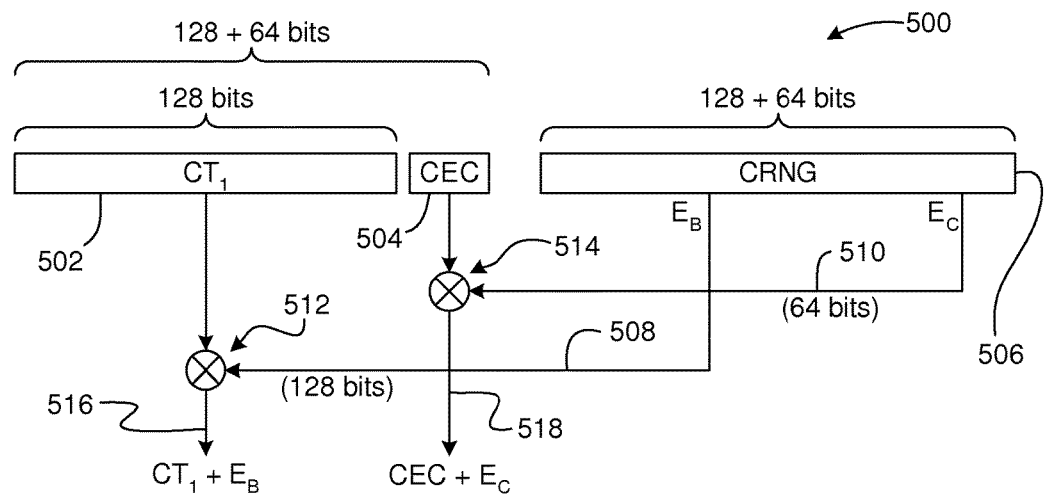
FIG. 5A illustrates selected details of an example embodiment of generation and injection of random error into a cipher-text data element and a code for error-correction created by non-deterministic encryption functionalities such as illustrated in FIGS. 2A-C, 3A-3D, 6, and 7.
Figure 5B:
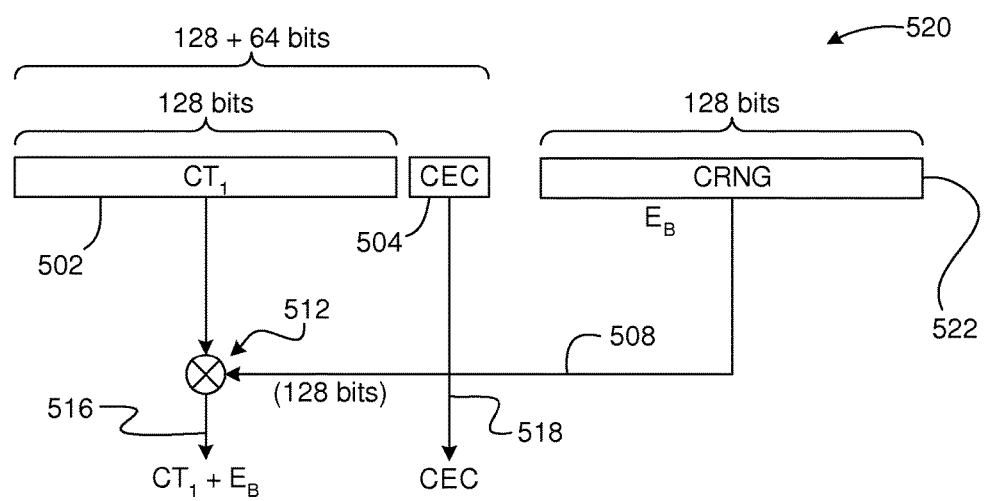
FIG. 5B illustrates selected details of a variation of the example of FIG. 5A, limiting the injection of random error into the cipher-text data element but not into the code for error-correction.
Figure 6:
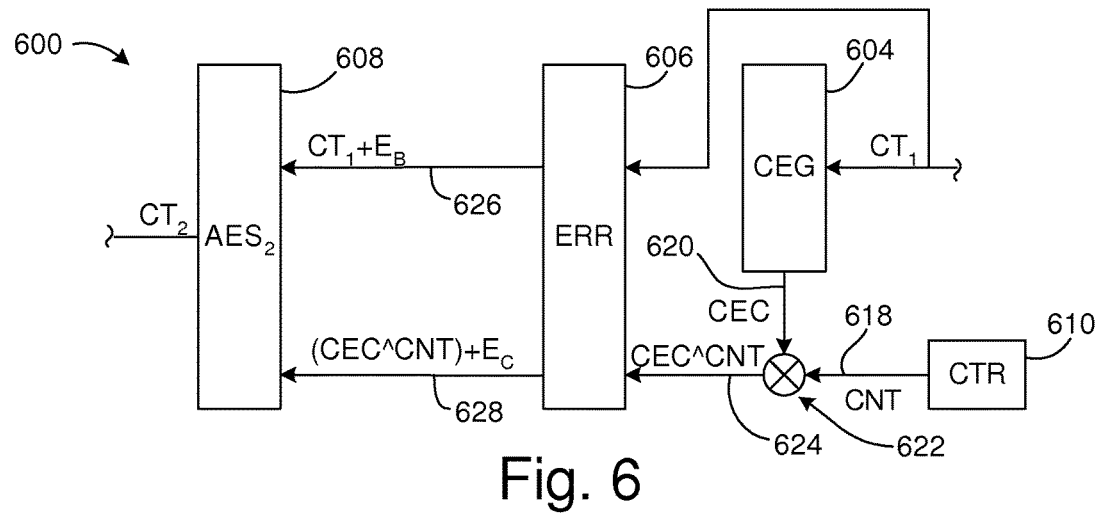
FIG. 6 illustrates selected details of another embodiment of encryption functionality of the engine NDE of FIG. 2A, including use of a counter CTR enabling initialization of encryption between arbitrary portions of open-text data, and is enabled to encrypt data for subsequent decrypting using the non-deterministic decryption functionality of FIG. 7.

FIGS. 5A and 5B are conceptual, and illustrate two examples of an error-injection layer usable in the non-deterministic encryption functionalities of NDE 225, and those illustrated by FIGS. 3A-3D (e.g. error-injection layer ERR 306), and FIG. 6 (ERR layer 606). The error-injection functionality is designated generally by the reference numerals 500 (FIG. 5A) and 520 (FIG. 5B).

In a specific example, error-injection functionality 500 includes cipher-text $CT_1$ 502 having a width of 128 bits, a code for error-correction CEC 504 having a width of 64 bits, a constrained pseudo-random number generator CRNG 506 having a width of 192 bits, and exclusive-OR functions 512 and 514 having widths of 128 bits and 64 bits, respectively.

Constrained pseudo-random number generator CRNG 506 is initialized by a non-deterministic key (not illustrated) and generates pseudo-random binary numbers constrained to include no more than a threshold number of binary ONEs per random number. For example, the threshold number represents the greatest number of single-bit errors capable of being corrected by injected error-correction layer ECE 404 of FIG. 4A. If the greatest number of errors that are correctable by injected error-correction layer ECE 404 is 32 errors, then no more than 32 binary ONEs are included in the constrained pseudo-random number produced by generator CRNG 506. In this example, the constrained binary number represents an error-mask E that is partitioned into a data field $E_B$ 508 of 128 bits and a remaining code for error-correction field $E_C$ 510 of 64 bits. The constrained pseudo-random number partition $E_B$, for example, will be exclusive-ORed with $CT_1$ to produce error-injected cipher-text $CT_1+E_B$ (recall that the "plus" sign, as used here, represents an exclusive-OR logic operation). In various embodiments, a new constrained pseudo-random number is created for every portion (or multiple thereof) processed by NDE 225. An example of a non-deterministic initialization key for a pseudo-random number generator such as described here uses a noise diode, such as a reverse-biased Zener diode operating in junction breakdown mode, connected to an analog-to-digital conversion stage for providing a non-deterministic initialization key value.

Error is injected into cipher-text $CT_1$ when error-mask data field $E_B$ is combined with $CT_1$ by exclusive-OR function 512 to produce error-injected cipher-text $CT_1+E_B$ 516. In like manner, error is injected into code for error-correction CEC when error-mask code for error-correction field $E_C$ is combined with CEC by exclusive-OR function 514 to produce error-injected code for error-correction CEC+$E_C$ 518. These operations are informally referred to as "overlay." The error is said to be "overlaid" upon CEC and/or $CT_1$, and in these examples "overlaid" means "exclusive-ORed with."

FIG. 5B illustrates selected details of an example of error-injection functionality 520, useful with non-deterministic encryption functionalities such as those illustrated in FIGS. 3E and 3F, in which error is injected into cipher-text $CT_1$ only, but not into code for error-correction CEC. Constrained pseudo-random number generator 522 is 128 bits in width, and the constrained binary number includes no more than a threshold number of binary ONEs within that width.

FIG. 6 illustrates selected details of an embodiment of a counter-initialized, non-deterministic encryption functionality of NDE 225 of FIG. 2A, and is designated generally by the reference numeral 600. Only those portions of non-deterministic encryption functionality 600 essential to describe its differences from the encryption functionalities illustrated in FIGS. 3A-3F are included. Counter CTR 610 is used as an alternative to an initializing vector for synchronizing encryption, e.g. an AES block-encryption or alternatively a stream-based encryption. The counter enables encryption to commence at any particular point in a stream of open-text rather than requiring re-synchronization of the entire stream using an initializing vector for preventing replay attacks. Counter 610 is initialized before use and the initial count is retained for use during decryption.

Code for error-correction generation layer CEG 604 receives cipher-text $CT_1$ and generates code for error-correction CEC 620. Exclusive-OR function 622 combines current count CNT 618 and code for error-correction CEC 620 to obtain compound error code for error-correction CEC^CNT 624, where the use of the caret """ sign represents an exclusive-OR operation. Error-injection layer ERR 606 receives a combination (e.g. zero or more concatenations and/or zero or more permutations) of cipher-text $CT_1$ and compound error code for error-correction CEC^CNT 624, and produces error-injected cipher-text $CT_1+E_B$ 626 and error-injected code (CEC^CNT)+$E_C$ 628. Output encryption layer $AES_2$ 608 encrypts error-injected cipher-text $CT_1+E_B$ 626 and error-injected code (CEC^CNT)+$E_C$ 628 and outputs cipher-text output $CT_2$. In other embodiments, a reversible scrambling layer SCR (not illustrated) is inserted as illustrated in FIGS. 3B-3C. In yet other embodiments, compound error code for error-correction CEC^CNT 624 bypasses error-injection layer ERR 606 and is applied directly to an output encryption layer $AES_2$, as is CEC in FIG. 3F, or, alternatively, is applied directly to a reversible scrambling layer, as is CEC in FIG. 3E.

Figure 7:
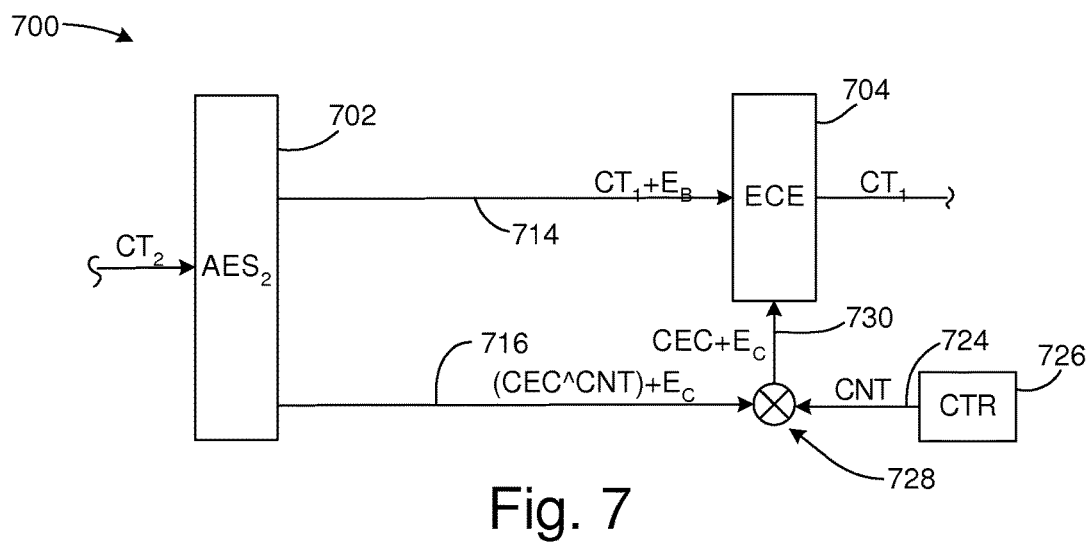
FIG. 7 illustrates selected details of an embodiment of decryption functionality of the engine NDE of FIG. 2A, and is enabled to decrypt data previously encrypted using the non-deterministic encryption functionality of FIG. 6.

FIG. 7 illustrates selected details of an embodiment of a counter-initialized, non-deterministic decryption functionality of NDE 225 of FIG. 2A, and is designated generally by the reference numeral 700. Only those portions of non-deterministic decryption functionality 700 essential to describe its differences from the decryption functionalities illustrated in FIGS. 4A-4C are included. When using copies of the keys previously used for encryption, and initializing counter CTR 726 with the initial value used for the previous encryption, non-deterministic decryption functionality 700 is useful for decrypting data produced by non-deterministic encryption functionality 600 of FIG. 6.

Input decryption layer $AES_2$ 702 receives and decrypts enlarged cipher-text input $CT_2$ to produce error-injected cipher-text $CT_1+E_B$ 714 and error-injected code (CEC^CNT)+$E_C$ 716, respectively.

Current count CNT 724, provided by initialized counter CTR 726, is combined with error-injected code (CEC^CNT)+$E_C$ 716 by exclusive-OR function 728 to recover error-injected code for error-correction CEC+$E_C$ 730.

Injected error-correction layer ECE 704 receives error-injected cipher-text $CT_1+E_B$ 714 and error-injected code for error-correction CEC+$E_C$ 730, corrects the injected error and recovers cipher-text $CT_1$. In other embodiments, a reversed-scrambling layer RSC (not illustrated) is inserted as illustrated in FIGS. 4B and 4C.

Example Implementation Techniques

In some embodiments, various combinations of all or portions of operations performed by an SSD controller that uses non-deterministic encryption and/or encrypted transport, e.g., with flash memories, a computing-host flash memory controller, and/or an SSD controller (such as SSD controller 100 of FIG. 1A), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments some, all, or various portions of the program instructions are realized as one or more functions, routines, sub-routines, in-line routines, procedures, macros, or portions thereof.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
    receiving unencrypted data from a computing host;
    encrypting the received unencrypted data to create a first cipher text with a first encryption key;
    generating one or more error-correction codes in response to the first cipher text;
    applying a first error mask to the error-correction codes and a second error mask to the first cipher text to inject a correctable non-deterministic error into each of the first cipher text and the error-correction codes;
    re-encrypting a combination of the error-injected first cipher text and error-correction codes with a second encryption key to create a single second cipher text; and
    formatting the single second cipher text wherein formatting comprises scrambling and modulating, to be compatible with storage in one or more non-volatile memories (NVMs), wherein the receiving, encrypting, generating, applying, re-encrypting, and formatting are each executed by a controller of a storage device comprising the NVMs.

2. The method of claim 1, further comprising:
    the encrypting and the re-encrypting employing a symmetric encryption standard and the first encryption key is different from the second encryption key.

3. The method of claim 2, further comprising:
    performing the receiving, encrypting, generating, applying, and re-encrypting within a secure physical boundary.

4. The method of claim 3, wherein the secure physical boundary comprises a single integrated circuit.

5. The method of claim 4, further comprising:
    saving the first and second encryption keys within the secure physical boundary.

6. The method of claim 1, further comprising:
    receiving a storage address from the computing host, and storing the formatted single second cipher text in the NVMs in accordance with the storage address.

7. The method of claim 1, wherein the receiving is via a storage interface compatible with a storage interface standard.

8. The method of claim 1, wherein the first error mask conducts a first logical operation comparing the first cipher text to a first constrained pseudo-random number and the second error mask conducts a second logical operation comparing the error-correction codes to a second constrained pseudo-random number, each constrained pseudo-random number generated from a non-deterministic key.

9. The method of claim 1, wherein the error-correction codes undergo a logically function to combine a counter value with the error-correction codes prior to application of the second error mask.

10. A method comprising:
    receiving a storage address from a computing host;
    importing raw data from one or more non-volatile memories (NVMs) in accordance with the storage address;
    correcting low-level errors on the raw data, based on low-level error-correction information contained therein, producing corrected data;
    unformatting the corrected data;
    decrypting the unformatted data with a first encryption key to create a first cipher text;
    partitioning the first cipher text into a data portion and an error-correction portion, the data portion comprising a second cipher text and a first error mask, the error-correction portion comprising error-correction codes and a second error mask;
    correcting injected errors of the first and second error masks to produce a second cipher text wherein the correcting injected errors on the data portion comprises processing portions of the data portion according to a first chunk size, the re-decrypting the error corrected data portion comprises processing the error corrected data portion according to a second chunk size, and the first and the second chunk sizes are different;
    re-decrypting the second cipher text with a second encryption key; and exporting the second cipher text to the computing host, wherein the receiving, importing, low-level error correcting, unformatting, decrypting, partitioning, injected error correcting, re-encrypting, and exporting are each executed by a controller of a storage device comprising the NVMs.

11. The method of claim 10, wherein the first and second encryption keys are different.

12. The method of claim 10, wherein the first error mask overlays a first binary logic operation and the second error mask overlays a different second logic operation.

13. The method of claim 12, wherein the first binary logic operation is a logical XOR.

14. The method of claim 12, wherein the second binary operation is a logical AND.

15. The method of claim 10, wherein the correcting step combines the data and error-correction portions into a single data stream of the second cipher text.

16. The method of claim 10, wherein the raw data is reverse scrambled prior to being decrypted with the first encryption key.

17. The method of claim 10, wherein the error-correction portion is combined with an exclusive-OR function to recover injected errors.

* * * * *